US011481346B2

(12) United States Patent
Li

(10) Patent No.: US 11,481,346 B2
(45) Date of Patent: Oct. 25, 2022

(54) METHOD AND APPARATUS FOR IMPLEMENTING DATA TRANSMISSION, ELECTRONIC DEVICE, AND COMPUTER-READABLE STORAGE MEDIUM

(71) Applicant: Tencent Technology (Shenzhen) Company Limited, Shenzhen (CN)

(72) Inventor: Jiaxin Li, Shenzhen (CN)

(73) Assignee: Tencent Technology (Shenzhen) Company Limited, Guangdong (CN)

(*) Notice: Subject to any disclaimer, the term of this patent is extended or adjusted under 35 U.S.C. 154(b) by 104 days.

(21) Appl. No.: 17/007,523

(22) Filed: Aug. 31, 2020

(65) Prior Publication Data
US 2020/0401542 A1 Dec. 24, 2020

Related U.S. Application Data

(63) Continuation of application No. PCT/CN2019/082225, filed on Apr. 11, 2019.

(30) Foreign Application Priority Data

May 31, 2018 (CN) .......................... 201810551660.7

(51) Int. Cl.
*G06F 13/36* (2006.01)
*G06F 13/40* (2006.01)

(52) U.S. Cl.
CPC .......... *G06F 13/36* (2013.01); *G06F 13/4004* (2013.01)

(58) Field of Classification Search
CPC ............................ G06F 13/36; G06F 13/4004
(Continued)

(56) References Cited

U.S. PATENT DOCUMENTS 4,598,362 A * 7/1986 Kinjo ................... G06F 13/1673
711/148
4,843,543 A * 6/1989 Isobe ...................... G06F 13/18
711/151
(Continued)

FOREIGN PATENT DOCUMENTS

CN 1052739 A 7/1991
CN 1578516 A 2/2005
(Continued)

OTHER PUBLICATIONS

International Search Report and Written Opinion for International Patent Application No. PCT/CN2019/082225 dated Jun. 27, 2019; 12 pages.
(Continued)

*Primary Examiner* — Paul R. Myers
(74) *Attorney, Agent, or Firm* — Crowell & Moring LLP

(57) ABSTRACT

This application discloses a method and an apparatus, an electronic device, and a computer-readable storage medium for implementing data transmission. The method is executed by an electronic device providing a computing service, and is applied to execution of data transmission between two buses of different types, wherein one of the two buses is associated with an FPGA instance among multiple FPGA instances run by the computing service and the other of the two buses corresponds to an external device to the electronic device, the method including: obtaining an access instruction from an initiator through a first bus of the two buses for data read/write in a target, wherein the initiator and the target are associated with the first bus and a second bus of the two buses, and comprise one and the other of the FPGA instance and the external device, respectively; buffering the access instruction into an instruction storage area corresponding to the access instruction; and transmitting the access instruction buffered in the instruction storage area to the target (Continued)

continuously, and suspending transmission of the access instruction to the target once a flow control is imposed.

20 Claims, 13 Drawing Sheets

(58) Field of Classification Search
USPC .......................................................... 710/29
See application file for complete search history.

(56) References Cited

U.S. PATENT DOCUMENTS

| | | | | |
|---|---|---|---|---|
| 5,191,649 | A * | 3/1993 | Cadambi | G06F 15/17 |
| | | | | 711/158 |
| 6,384,930 | B1 * | 5/2002 | Ando | G06F 3/1247 |
| | | | | 358/1.9 |
| 7,461,236 | B1 | 12/2008 | Wentzlaff | |
| 8,489,794 | B2 * | 7/2013 | Byrne | G06F 13/4027 |
| | | | | 710/110 |
| 2001/0053148 | A1 * | 12/2001 | Bilic | H04L 69/22 |
| | | | | 370/429 |
| 2002/0049875 | A1 * | 4/2002 | Giora | H04L 69/00 |
| | | | | 710/301 |
| 2003/0088750 | A1 * | 5/2003 | Wu | G06F 13/4059 |
| | | | | 711/167 |
| 2006/0242330 | A1 * | 10/2006 | Torudbakken | G06F 13/4004 |
| | | | | 710/5 |
| 2007/0067549 | A1 * | 3/2007 | Gehman | G06F 13/4031 |
| | | | | 710/315 |
| 2007/0101242 | A1 * | 5/2007 | Yancey | G06F 13/4256 |
| | | | | 714/776 |
| 2007/0115939 | A1 * | 5/2007 | Lee | H04L 45/06 |
| | | | | 370/352 |
| 2011/0055439 | A1 | 3/2011 | Chen et al. | |
| 2012/0110234 | A1 * | 5/2012 | Gruber | H04L 69/04 |
| | | | | 710/315 |
| 2012/0117286 | A1 * | 5/2012 | Yun | G06F 13/4027 |
| | | | | 710/110 |
| 2013/0047250 | A1 * | 2/2013 | Kothari | H03L 7/0802 |
| | | | | 726/16 |
| 2013/0067144 | A1 * | 3/2013 | Namba | G06F 3/065 |
| | | | | 711/E12.001 |
| 2013/0159595 | A1 * | 6/2013 | Zhou | G06F 13/4022 |
| | | | | 710/317 |
| 2014/0289445 | A1 * | 9/2014 | Savich | G06F 17/16 |
| | | | | 710/317 |
| 2015/0120978 | A1 * | 4/2015 | Kalyanasundharam | |
| | | | | G06F 12/1009 |
| | | | | 710/267 |
| 2016/0098212 | A1 * | 4/2016 | Tokoyoda | G11C 7/00 |
| | | | | 711/154 |
| 2017/0185519 | A1 * | 6/2017 | Marshall | G06F 12/0891 |
| 2017/0242813 | A1 | 8/2017 | Manikfan et al. | |
| 2018/0143903 | A1 * | 5/2018 | Wu | G06F 12/121 |
| 2018/0246828 | A1 * | 8/2018 | Choi | G06F 13/37 |
| 2019/0042350 | A1 * | 2/2019 | Nadathur | G06F 11/0721 |
| 2019/0042533 | A1 * | 2/2019 | Custodio | H03K 19/17756 |
| 2019/0391929 | A1 * | 12/2019 | Arbel | G06F 12/1027 |

FOREIGN PATENT DOCUMENTS

| | | |
|---|---|---|
| CN | 1936873 A | 3/2007 |
| CN | 101276318 A | 10/2008 |
| CN | 101650701 A | 2/2010 |
| CN | 102521190 A | 6/2012 |
| CN | 102841869 A | 12/2012 |
| CN | 102999467 A | 3/2013 |
| CN | 103049414 A | 4/2013 |
| CN | 104346135 A | 2/2015 |
| CN | 104467909 A | 3/2015 |
| CN | 104579885 A | 4/2015 |
| CN | 104679702 A | 6/2015 |
| CN | 105183680 A | 12/2015 |
| CN | 204886928 U | 12/2015 |
| CN | 105279123 A | 1/2016 |
| CN | 105335326 A | 2/2016 |
| CN | 107426246 A | 12/2017 |
| CN | 107577636 A | 1/2018 |

OTHER PUBLICATIONS

Chinese Office Action for Chinese Patent Application No. 201810551660.7 dated Dec. 3, 2021, 9 pages.

Chinese Office Action with English Translation of Concise Explanation of Relevance for Chinese Patent Application No. 201810551660.7 dated Jun. 16, 2022, 7 pages.

* cited by examiner

METHOD AND APPARATUS FOR IMPLEMENTING DATA TRANSMISSION, ELECTRONIC DEVICE, AND COMPUTER-READABLE STORAGE MEDIUM

RELATED APPLICATION

This application is a continuation application of the International PCT Application No. PCT/CN2019/082225, filed with the China National Intellectual Property Administration, PRC on Apr. 11, 2019 which claims priority to Chinese Patent Application No. 201810551660.7, entitled "METHOD AND APPARATUS FOR IMPLEMENTING DATA TRANSMISSION, AND ELECTRONIC DEVICE" and filed with the China National Intellectual Property Administration, PRC on May 31, 2018, which are incorporated herein by reference in their entireties.

FIELD OF THE TECHNOLOGY

This application relates to the field of integrated circuit technologies, and in particular, to a method and an apparatus, an electronic device, and a computer-readable storage medium for implementing data transmission.

BACKGROUND OF THE DISCLOSURE

With the rapid development of deep sub-micron manufacturing technologies and design technologies of integrated circuits (ICs), the integrated circuits have entered the era of system on chip (SOC). The so-called system on chip is a system-level integrated circuit. Meanwhile, the IC designing method has also evolved from a timing-driven mode to a resource reuse mode based on an Intellectual Property (IP) core.

Field programmable gate array (FPGA) chip manufacturers define different internal bus interconnection standards, and data transmission bandwidths of different types of buses are different. Therefore, when a user design based on a first bus in a chip A is migrated to a chip B based on a second bus, data transmitted through the first bus and the second bus can only be transmitted according to the bus standard with a smaller bandwidth due to different transmission bandwidths of the first bus and the second bus, thus affecting data transmission efficiency and wasting the transmission bandwidth of the other bus. If a system structure of the user design is adjusted to adapt to a new bus bandwidth, it takes a lot of time and effort, thus increasing development costs.

In conclusion, because different types of buses have different transmission bandwidths, the data transmission efficiency is affected, and the bus bandwidth is wasted during cross-chip migration of the user design.

SUMMARY

To resolve the aforementioned problem in the related art that data transmission efficiency is affected and bus bandwidths are wasted during cross-chip migration of a user design because different types of buses have different transmission bandwidths, this application provides a method for implementing data transmission with high efficiency.

According to one aspect, this application provides a method for implementing data transmission, executed by an electronic device providing a computing service, the method being applied to execution of data transmission between two buses of different types, wherein one of the two buses is associated with an instance among multiple instances run by the computing service and the other of the two buses corresponds to an external device to the electronic device, the method including:

obtaining an access instruction from an initiator through a first bus of the two buses for data read/write in a target, wherein the initiator and the target are associated with the first bus and a second bus of the two buses, and comprise one and the other of the instance and the external device, respectively;

buffering the access instruction into an instruction storage area corresponding to the access instruction; and transmitting the access instruction buffered in the instruction storage area to the target continuously, and suspending transmission of the access instruction to the target once flow control is imposed.

According to another aspect, this application further provides an apparatus for implementing data transmission, the apparatus being applied to execution of data transmission between two buses of different types, wherein one of the two buses is associated with an instance among multiple instances run by a computing service provided by the apparatus and the other of the two buses corresponds to an external device to the apparatus, the apparatus including:

an instruction obtaining module, configured to obtain an access instruction from an initiator through a first bus of the two buses for data read/write in a target, wherein the initiator and the target are associated with the first bus and a second bus of the two buses, and comprise one and the other of the FPGA instance and the external device, respectively;

an instruction buffer module, configured to buffer the access instruction into an instruction storage area corresponding to the access instruction; and an instruction transmission module, configured to transmit the access instruction buffered in the instruction storage area to the target continuously, and suspending transmission of the access instruction to the target once flow control is imposed.

This application further provides an electronic device, the electronic device including:

a processor; and a memory in communication with the processor, configured to store a processor-executable instruction, where the processor is configured to perform the foregoing method for implementing data transmission.

In addition, this application further provides a computer-readable storage medium, storing a processor-executable instruction, the instruction, when executed by one or more processors, completing the foregoing method for implementing data transmission.

It is to be understood that the foregoing general descriptions and the following detailed descriptions are only exemplary, and cannot limit this application.

BRIEF DESCRIPTION OF THE DRAWINGS

Accompanying drawings herein are incorporated into the specification and form a part of this specification, show embodiments that conform to this application, and are used to describe a principle of this application together with this specification.

DESCRIPTION OF EMBODIMENTS

Exemplary embodiments are described in detail herein, and examples of the exemplary embodiments are shown in the accompanying drawings. When the following descriptions relate to the accompanying drawings, unless otherwise indicated, same numbers in different accompanying drawings represent same or similar elements. The implementations described in the following exemplary embodiments do not represent all implementations that are consistent with this application. On the contrary, the implementations are merely examples of apparatuses and methods that are described in detail in the appended claims and that are consistent with some aspects of this application.

At present, the mainstream field programmable gate array (FPGA) chip manufacturers include Intel and Xilinx. Xilinx generally uses an AXI bus to interconnect functional modules inside a chip, while Intel uses a CCI-P bus to interconnect functional modules inside a chip. Because FPGA chips provided by different manufacturers use different types of buses for interconnection, in order to minimize secondary developments by users, in this application, a fast link protocol converter is added inside the FPGA chip, to implement conversion between the CCI-P bus and the AXI bus, so that an instance based on the AXI bus in the FPGA chip provided by Xilinx can be easily migrated into the FPGA chip based on the CCI-P bus provided by Intel.

Figure 1:
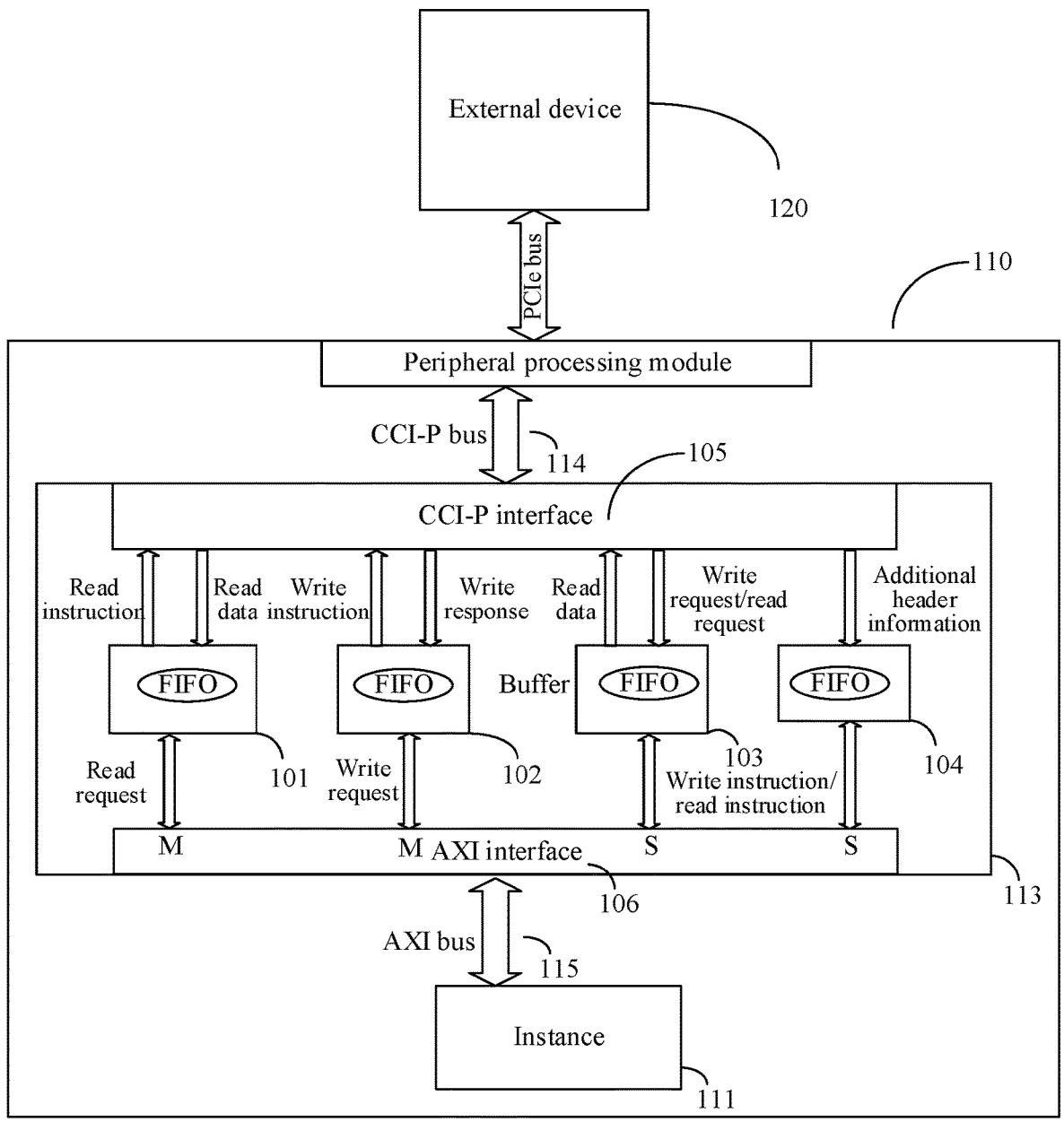
FIG. 1 is a schematic diagram of an exemplary implementation environment after an instance based on an AXI bus is migrated to an FPGA chip based on a CCI-P bus.

FIG. 1 is a schematic diagram of an exemplary implementation environment after an instance based on an AXI bus is migrated to an FPGA chip based on a CCI-P bus. As shown in FIG. 1, the implementation environment includes: an FPGA chip 110 and an external device 120 configured to run an application program, the external device 120 is external to the FPGA chip 110 and is interconnected with the FPGA chip 110 through a PCIe bus.

An instance 111 is a program run by a computing service, such as deep learning, graphic image compression and genomics, migrated from a chip based on an AXI bus 115. As shown in FIG. 1, a fast link protocol converter 113 for implementing data transmission in this application may be deployed inside the FPGA chip 110 so that when the instance 111 based on the AXI bus 115 is migrated into the FPGA chip 110 based on a CCI-P bus 114, the instance may be interconnected with the CCI-P bus 114 of the FPGA chip 110.

As shown in FIG. 1, the fast link protocol converter 113 includes a plurality of FIFOs (first in first out data buffers), used for respectively buffering data transmitted from the external device 120 to the instance 111 and data transmitted from the instance 111 to the external device 120. Even though the AXI bus 115 and the CCI-P bus 114 have different clock cycles and different bandwidths for data transmission, a waste of transmission bandwidths is avoided by buffering the data transmitted between the AXI bus 115 and the CCI-P bus 114 when high-speed data needs to be transmitted. If a flow control signal is not received, the buffered data is continuously transmitted to a receiver, thereby implementing streaming mode transmission of the data and improving data transmission efficiency. Furthermore, the data may be outputted according to a clock cycle of the receiver, thereby implementing asynchronous data transmission.

As shown in FIG. 1, the foregoing fast link protocol converter 113 may include a read-link streaming module 101, a write-link streaming module 102, a full-link streaming module 103 and a co-link streaming module 104, each of the modules including a FIFO. The fast link protocol converter 113 may also include a CCI-P interface 114 connected to the CCI-P bus, and an AXI interface 115 connected to the AXI bus.

The read-link streaming module 101 may receive a read request transmitted through the AXI bus 115 by the instance 111, and process the read request to obtain a read instruction. The read instruction is buffered in a read instruction asynchronous FIFO, and then the read instruction is asynchronously transmitted to the CCI-P bus 114 in a stream mode, to obtain read data returned by the external device 120 in response to the read instruction. The read-link streaming module 101 buffers the read data in a read data asynchronous FIFO, and then asynchronously transmits, in the stream mode through the AXI bus 115, the read data returned by the external device 120 to the instance 111 run by the computing service, so that the instance 111 may perform data analysis on the received read data.

The write-link streaming module 102 may receive a write request transmitted through the AXI bus 115 by the instance 111, and process the write request to obtain a write instruction. The write instruction is buffered in a write instruction asynchronous FIFO, then the write instruction is asynchronously transmitted to the CCI-P bus 114 in the stream mode, and the external device 120 writes data carried in the write instruction and returns a write response. The write-link streaming module 102 buffers the write response in a write response asynchronous FIFO, and then asynchronously transmits, in the stream mode through the AXI bus 115, the write response to the instance 111. The write data may be a result obtained by performing the data analysis on the foregoing read data by the instance 111.

The full-link streaming module 103, provided with a parallel reading and writing function, may receive a read request and a write request transmitted by the external device 120 through the CCI-P bus 114 in parallel and process the read request and write request to obtain a read instruction and a write instruction, buffer the read instruction in the read instruction asynchronous FIFO, buffer the write instruction in the write instruction asynchronous FIFO, and then asynchronously transmit the read instruction or the write instruction to the AXI bus 115 in the stream mode, to obtain read data returned by the instance 111 in response to the read instruction, or a write response returned in response to the write instruction. The full-link streaming module 103 may further buffer the write response or the read data, and asynchronously transmit the write response or the read data to the external device 120 through the CCI-P bus 114 in the stream mode.

The co-link streaming module 104 is configured to transmit low-speed configuration information to the AXI bus 115. For example, the co-link streaming module 104 may assist the read-link streaming module 101 and the write-link streaming module 102 in returning header information of the read data and header information of the write response to the AXI bus 115, transmitting a check code for error detection and correction, or the like.

In the related art, in order to migrate a user design (namely, the instance 111) of an Xilinx chip into an Intel chip, an interface needs to be redesigned and a system structure of the user design needs to be adjusted to adapt to the bus bandwidth and timing of the Intel chip, thus requiring higher design costs. The method provided in this application implements data transmission between different types of buses, thereby implementing cross-chip migration of the user design and saving development costs.

Figure 2:
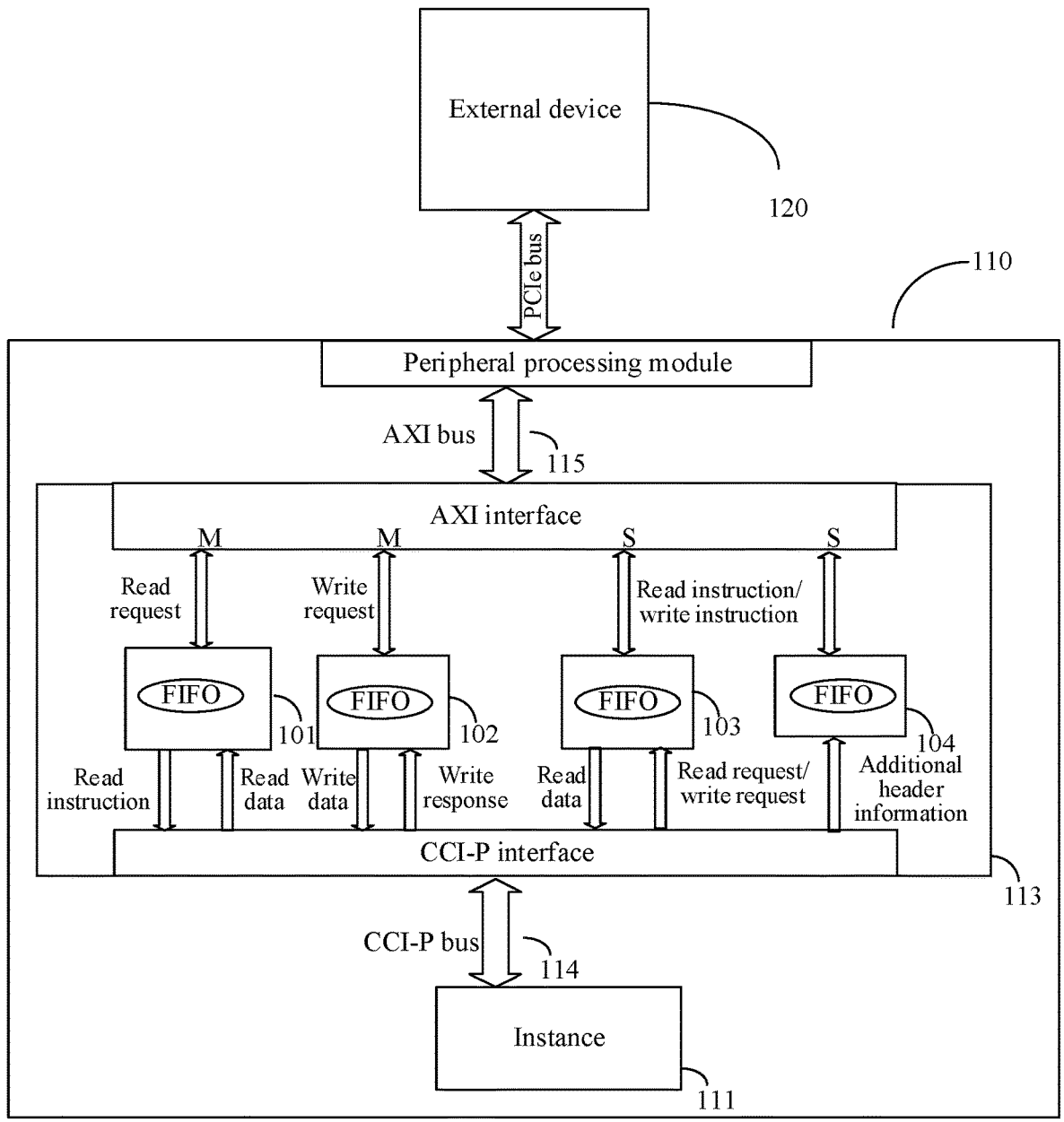
FIG. 2 is a schematic diagram of an exemplary implementation environment after an instance based on a CCI-P bus is migrated to an FPGA chip based on an AXI bus.

FIG. 2 is a schematic diagram of an exemplary implementation environment after an instance based on a CCI-P bus is migrated to an FPGA chip based on an AXI bus. The implementation environment includes: an FPGA chip 110 and an external device 120 configured to run an application program, the external device 120 and the FPGA chip 110 being interconnected through a PCIe bus.

An instance 111 is a program run by a computing service, such as deep learning, graphic image compression and genomics, migrated from a chip based on a CCI-P bus 114. As shown in FIG. 2, a fast link protocol converter 113 for implementing data transmission in this application may be deployed in the FPGA chip 110 so that when the instance 111 based on a CCI-P bus 114 is migrated into the FPGA chip 110 based on the AXI bus 115, the instance may be interconnected with the AXI bus 115 of the FPGA chip 110.

Similar to FIG. 1, a fast link protocol converter includes a plurality of FIFOs, used for respectively buffering data transmitted from the external device 120 to the instance 111 and data transmitted from the instance 111 to the external device 120, thereby implementing asynchronous transmission and stream mode data transmission between the AXI bus 115 and the CCI-P bus 114.

As shown in FIG. 2, a fast link protocol converter 113 may include a read-link streaming module 101, a write-link streaming module 102, a full-link streaming module 103 and a co-link streaming module 104, each of the modules including a FIFO.

The read-link streaming module 101 may receive a read request transmitted through the AXI bus 115 by the external device 120, and process the read request to obtain a read instruction. The read instruction is buffered in a read instruction asynchronous FIFO, and then the read instruction is asynchronously transmitted to the CCI-P bus 114 in a stream mode, to obtain read data returned by the instance 111 in response to the read instruction. The read-link streaming module 101 further buffers the read data in a read data asynchronous FIFO, and then asynchronously transmits the read data returned by the instance 111 to the external device 120 in the stream mode through the AXI bus 115, so that the external device 120 may perform data analysis on the received read data.

The write-link streaming module 102 may receive a write request transmitted by the external device 120 through the AXI bus 115 and process the write request to obtain a write instruction, buffer the write instruction in a write instruction asynchronous FIFO, and then asynchronously transmit the write instruction to the CCI-P bus 114 in the stream mode, to obtain a write response returned by the instance 111 in response to the write instruction. The write-link streaming module 102 may further buffer the write response in a write response asynchronous FIFO and asynchronously transmit the write response to the external device 120 through the AXI bus 115 in the stream mode. The write data may be a result obtained by performing the data analysis on the foregoing read data by the external device 120.

The full-link streaming module 103, provided with a parallel reading and writing function, may receive a read request and a write request transmitted by the instance 111 through the CCI-P bus 114 in parallel and process the read request and the write request to obtain a read instruction and a write instruction. The read instruction is buffered in a read instruction asynchronous buffer, the write instruction is buffered in a write instruction asynchronous buffer, and then the read instruction or the write instruction is asynchronously transmitted to the AXI bus 115 in the stream mode, to obtain read data returned by the external device 120 in response to the read instruction. The full-link streaming module 103 may further buffer the read data, and asynchronously transmit the read data to the instance 111 through the CCI-P bus 114 in the stream mode.

The co-link streaming module 104 is configured to transmit low-speed configuration information to the AXI bus 115. For example, the co-link streaming module 104 may assist the read-link streaming module 101 and the write-link streaming module 102 in returning header information of the read data and header information of the write response to the AXI bus 115, transmitting a check code for error detection and correction, or the like. It is to be understood that the exemplary implementation environments as shown in FIG. 1 and FIG. 2 are merely two examples, and may not be considered as any limitations to this application. For example, this application supports any types of buses in addition to the AXI and CCI-P buses described above.

Figure 3:
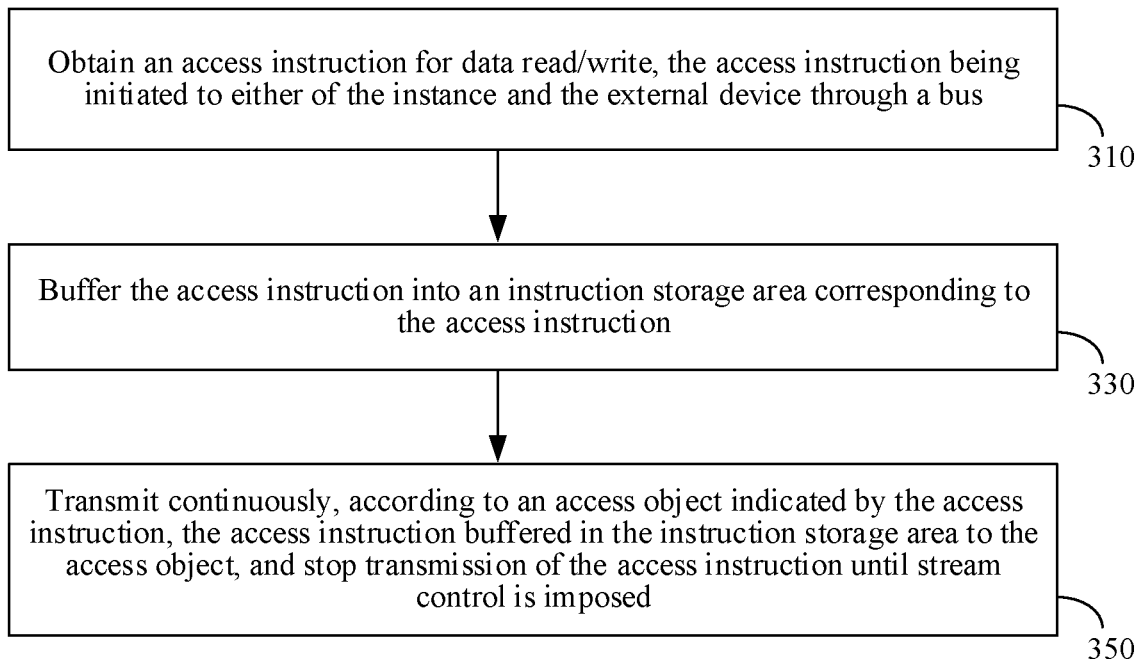
FIG. 3 is a flowchart of a method for implementing data transmission according to an exemplary embodiment.

FIG. 3 is a flowchart of a method for implementing data transmission according to an exemplary embodiment. As an example of the application scope, the method for implementing data transmission may be applied in the FPGA chip 110 of the implementation environment shown in FIG. 1, to implement data transmission between different types of buses with one corresponding to an instance run by a computing service and the other corresponding to an external device. As shown in FIG. 3, the method is executed by an electronic device described below, and the method may specifically include the following steps:

Step 310. Obtain an access instruction for data read/write, the access instruction being initiated by either of the instance and the external device through a bus.

The computing service is a certain data processing function deployed by the FPGA chip, for example, a computing service of deep learning, graphic image compression, and genomics. The instance refers to a program module that completes the foregoing computing service. The external device is a terminal device running an application program, for example, a host of a computer. A bus used in the FPGA chip may be an AXI bus or a CCI-P bus, or the like. The instance may be migrated from another design, and may use a bus of a different type. For example, if the FPGA chip uses an AXI bus, the migrated instance may use a CCI-P bus. If the FPGA chip uses a CCI-P bus, the migrated instance may use an AXI bus. The method provided according to this application may be used for implementing data transmission between the CCI-P bus and the AXI bus.

The access instruction may be generated according to an access request, the access instruction including a read instruction and a write instruction. The access request may be a request initiated by the instance and used for performing data read/write on the external device through the AXI bus and the CCI-P bus. The access request may alternatively be a request initiated by the external device and used for performing data read/write on the instance through the AXI bus and the CCI-P bus. Because the AXI bus and the CCI-P bus have different timing and bandwidths, the FPGA chip may implement conversion between the CCI-P bus and the AXI bus through a fast link protocol converter. The fast link protocol converter may receive the access request transmitted by the instance or the external device, and process a read request or write request to obtain the access instruction.

Step 330. Buffer the access instruction into an instruction storage area corresponding to the access instruction.

The buffering the access instruction into an instruction storage area corresponding to the access instruction is to store access instructions for the same access object together. The instruction storage area may be an asynchronous FIFO deployed in the FPGA chip, write operation instructions for the same access object being stored in a write instruction asynchronous FIFO, and read operation instructions for the same access object being stored in a read instruction asynchronous FIFO. According to a generating sequence of access instructions, the access instructions are stored in the instruction storage area sequentially, and according to a first in first out principle, the access instructions are read sequentially for output when no back pressure signal is received. In one embodiment, the back pressure signal is sent by the recipient of the access instructions to indicate that the recipient is not able to receive or handle more access instructions.

Specifically, the fast link protocol converter of the FPGA chip stores the access instructions obtained by processing the access request in the corresponding instruction storage area sequentially. A read instruction of accessing the external device by the FPGA chip is buffered in a first FIFO, a write instruction of accessing the external device by the FPGA chip is buffered in a second FIFO, a read instruction of accessing the instance in the FPGA chip by the external device is buffered in a third FIFO, and a write instruction of accessing the instance in the FPGA chip by the external device is buffered in a fourth FIFO.

Step 350. Transmit continuously, according to an access object indicated by the access instruction, the access instruction buffered in the instruction storage area to the access object, and stop transmission of the access instruction until flow control is imposed.

If the access instruction is generated according to the access request transmitted by the instance, then the access object is the external device. On the other hand, if the access instruction is generated according to the access request transmitted by the external device, then the access object is the instance in the FPGA chip. The bus corresponding to the instance may be the AXI bus, and the bus corresponding to the external device is the CCI-P bus. Alternatively, the bus corresponding to the instance may be the CCI-P bus, and the bus corresponding to the external device nay be the AXI bus. The AXI bus is an on-chip bus developed by ARM for high performance, high bandwidth and low delay data transmission. The CCI-P bus is a bus developed by Intel for on-chip cache application. The conversion between the CCI-P bus and the AXI bus may be implemented by using the method provided in this application, so that instances of other FPGA chips can be easily migrated to the FPGA chip 110.

The flow control means that transmission of the access instruction needs to be paused because access object data cannot be processed by the access object. In an embodiment, it can be considered that transmission of an access instruction is under flow control if a flow control signal returned by an access object for the access instruction is received, and then the transmission of the access instruction is stopped. When the access object has no extra processing capability to process the access instruction, the flow control signal is transmitted to the FPGA chip. The fast link protocol converter of the FPGA chip continuously transmits the buffered access instruction to the access object through a bus corresponding to the access when the flow control signal returned by the access object for the access instruction is not received, thereby implementing stream mode transmission of the data and improving transmission efficiency. The transmission of the access instruction to the access object is stopped when the flow control signal for the access instruction is received.

In an embodiment, the access object is the external device. The fast link protocol converter of the FPGA chip continuously transmits a buffered read instruction to the external device until a flow control signal returned by the external device for the read instruction is received, and then pauses transmission of the read instruction. Meanwhile, the fast link protocol converter of the FPGA chip continuously transmits a buffered write instruction to the external device until a flow control signal returned by the external device for the write instruction is received, and then pauses transmission of the write instruction. In other words, there is no interference between transmission of the read instruction and transmission of the write instruction. The transmission of the read instruction is paused if the flow control signal corresponding to the read instruction is received. In this case, however, the transmission of the write instruction may be continued if the flow control signal corresponding to the write instruction is not received.

It is to be emphasized that because the AXI bus and the CCI-P bus are different types of buses, data can only be transmitted according to the specification of the bus with a smaller bandwidth. When high-speed data needs to be transmitted, this will cause a waste of transmission bandwidth on the bus with a higher bandwidth since the bandwidth is under-used. In this application, by buffering the access instruction, the buffered access instruction can be continuously transmitted to the access object when the flow control signal returned by the access object is not received.

For example, high-speed data transmitted by the AXI bus may be buffered when the transmission bandwidth of the AXI bus is relatively large and the transmission bandwidth of the CCI-P bus is relatively small, and the buffered data is continuously transmitted to the CCI-P bus when no flow control signal is received, thereby improving data transmission efficiency to a maximum extent and improving a throughput.

The technical solution provided by this application implements stream mode transmission of an access instruction and improves data transmission efficiency by buffering the access instruction transmitted through different types of buses between an instance and an external device, continuously transmitting the buffered access instruction to an access object of the access instruction, and stopping transmitting the access instruction to the access object until flow control is imposed. The problem of a waste of bandwidths caused by different bandwidths of the different types of buses in cross-chip migration of the instance is resolved by buffering the access instruction, so that the instance does not need to be adjusted and development costs are reduced.

In an exemplary embodiment, the foregoing step 350 specifically includes:

transmitting continuously, according to a clock cycle of transmitting the access instruction to the access object, the access instruction buffered in the instruction storage area to the access object, until receiving a flow control signal returned by the access object for the access instruction.

The clock cycle refers to a time sequence of transmitting the access instruction to the access object by the bus corresponding to the access object. The flow control signal may be a back pressure signal or other signals used for indicating that the data transmission needs to be paused because data cannot be processed by the access object. The fast link protocol converter of the FPGA chip continuously reads and transmits the access instruction from the instruction storage area to the access object according to the time sequence, until receiving the flow control signal such as a back pressure signal from the access object indicating the access instruction cannot be processed, and then pauses transmitting the access instruction to the access object. When a signal for canceling back pressure is received, the transmission of the access instruction to the access object is resumed.

It is assumed that the bus corresponding to the instance is the AXI bus and the bus corresponding to the external device is the CCI-P bus, and clock cycles of the different types of buses are different. It is assumed that the access instruction is initiated by the instance and is used for accessing the external device. According to this application, the access instruction transmitted between the AXI bus and the CCI-P bus is buffered through the fast link protocol converter, so that the fast link protocol converter can receive and buffer the transmitted access instruction according to the clock cycle of the AXI bus, and then transmit the buffered access instruction to the external device according to the clock cycle of the CCI-P bus, thereby implementing asynchronous data transmission between the different types of buses in the FPGA chip.

Figure 4:
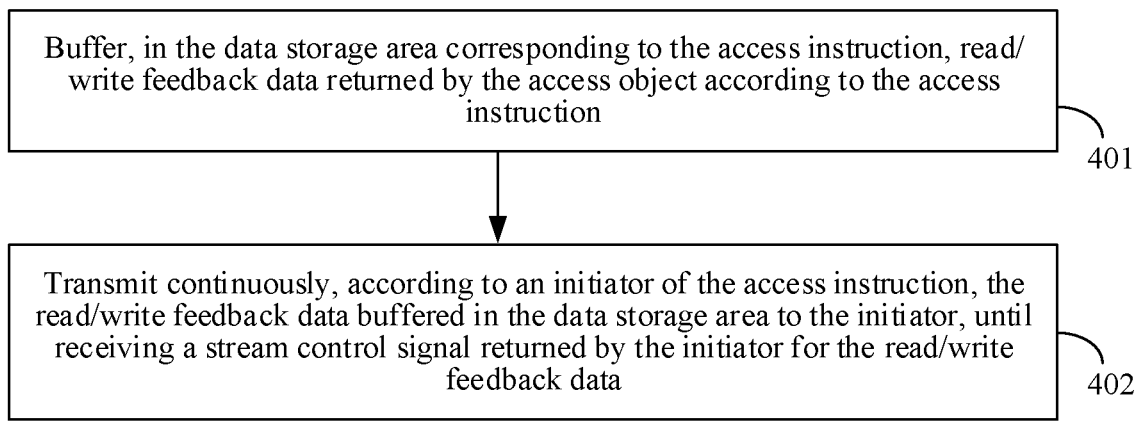
FIG. 4 is a flowchart of a method for implementing data transmission provided by another exemplary embodiment based on the embodiment corresponding to FIG. 3.

In an exemplary embodiment, as shown in FIG. 4, after the foregoing step 350, the method for implementing data transmission provided by this application further includes the following steps:

Step 401. Buffer, in the data storage area corresponding to the access instruction, read/write feedback data returned by the access object according to the access instruction.

The data storage area is used for storing the read/write feedback data returned by the access object in response to the access instruction. The read/write feedback data includes read data and a write response. The data storage area includes a write response asynchronous FIFO and a read data asynchronous FIFO. The write response asynchronous FIFO is configured to buffer the write response returned by the access object according to the write instruction, and the read data asynchronous FIFO is configured to buffer the read data (i.e., retrieved data in response to the read instruction) returned by the access object according to the read instruction.

Specifically, after the fast link protocol converter of the FPGA chip receives the read/write feedback data returned by the access object in response to the access instruction, the read/write feedback data is buffered in the data storage area corresponding to the access instruction. For example, the write response returned by the access object in response to the write instruction is buffered in the write response asynchronous FIFO, and the read data returned by the access object in response to the read instruction is buffered in the read data asynchronous FIFO.

Step 402. Transmit continuously, according to an initiator of the access instruction, the read/write feedback data buffered in the data storage area to the initiator, until receiving a flow control signal returned by the initiator for the read/write feedback data.

The initiator of the access instruction can be the instance or the external device. If the initiator is the instance, then the access object is the external device; if the initiator is the external device, then the access object is the instance. For example, in a scenario where the initiator is the instance and the access object is the external device, the fast link protocol converter of the FPGA chip transmits the buffered access instruction (for example, the read instruction) to the external device, receives the read data returned by the external device according to the read instruction, and then buffers the read data in the read data asynchronous FIFO. The fast link protocol converter transmits, according to a first in first out principle, the read data buffered in the read data asynchronous FIFO to the instance until receiving the flow control signal returned by the instance for the read data, and then suspends returning the read data.

Further, the foregoing step 350 specifically includes:

when the data storage area is not full, transmitting the access instruction to the access object continuously until receiving the flow control signal returned by the access object for the access instruction.

In other words, before transmitting the buffered access instruction to the access object, the FPGA chip needs to determine whether the data storage area is not full. Because a user of the data storage area buffers the read/write feedback data returned by the access object according to the access instruction, if the data storage area is full, the returned read/write feedback data cannot be written into the data storage area and needs to be stored elsewhere. Therefore, if the data storage area is not full, the FPGA chip continuously transmits the buffered access instruction to the access object until the flow control signal returned by the access object for the access instruction is received.

Figure 5:
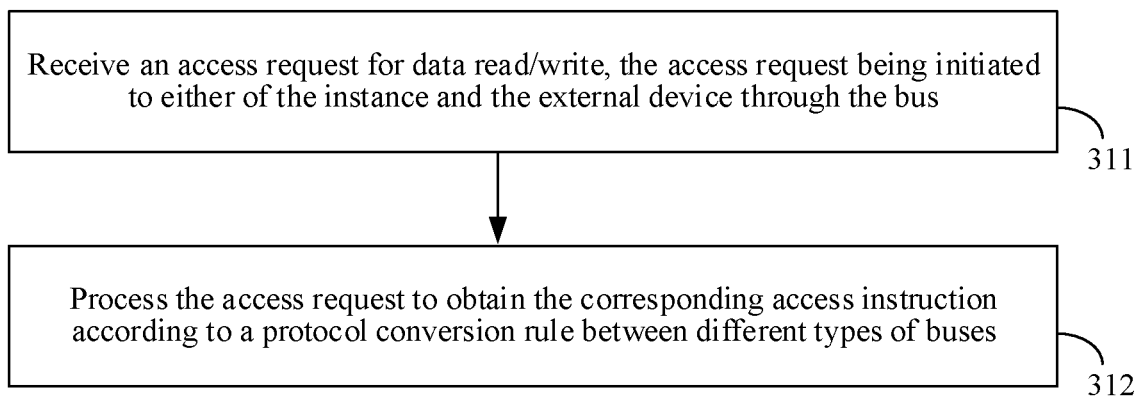
FIG. 5 is a flowchart of details of step 310 in the embodiment corresponding to FIG. 3.

In an exemplary embodiment, as shown in FIG. 5, the foregoing Step 310 specifically includes the following steps:

Step 311. Receive an access request for data read/write, the access request being initiated by either the instance or the external device through the bus.

The access request may be initiated by the instance or the external device. In an embodiment, the fast link protocol converter of the FPGA chip receives, through the AXI bus or the CCI-P bus corresponding to the instance run by the computing service, the access request initiated by the instance to perform data read/write on the external device. In another embodiment, the access request initiated by the external device to perform data read/write on the instance run by the computing service is received through the AXI bus or the CCI-P bus corresponding to the external device.

Step 312. Process the access request to obtain the corresponding access instruction according to a protocol conversion rule between the different types of buses.

The FPGA chip 110 may store the protocol conversion rule between different buses in advance. According to a protocol conversion rule between the AXI bus and the CCI-P bus, the access request transmitted by the instance through the AXI bus may be mapped according to the protocol conversion rule, to obtain an access instruction for accessing the CCI-P bus. In other embodiments, the access request transmitted by the instance through the CCI-P bus may be mapped according to the protocol conversion rule, to obtain an access instruction for accessing the AXI bus. For example, according to the protocol conversion rule, a read address of the CCI-P bus may be calculated according to information carried in the access request including the read address of the AXI bus and other control information (such as a check code), so an access instruction containing the calculated read address of the CCI-P bus may be obtained, and then data stored corresponding to the read address may be obtained by transmitting the access instruction to the external device.

Figure 6:
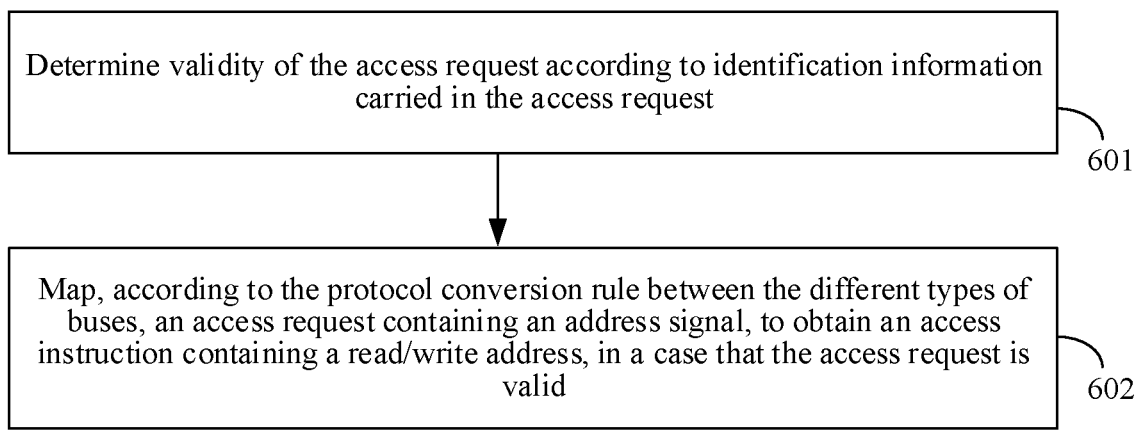
FIG. 6 is a flowchart of details of step 312 in the embodiment corresponding to FIG. 5.

Furthermore, as shown in FIG. 6, the foregoing step 312 specifically includes the following steps:

Step 601. Determine validity of the access request according to identification information carried in the access request.

The identification information is used for indicating the validity of the access request. For example, an access request carries identification information a, indicating execution of a read operation. An access request carries identification information b, indicating execution of a write operation. If the foregoing identification information is not carried in the access request, it indicates that the access request is invalid. Therefore, based on the identification information carried in the access request, whether the access request is valid can be determined, and an invalid access request may not be processed.

Step 602. Map, according to the protocol conversion rule between the different types of buses, an access request containing an address signal, to obtain an access instruction containing a read/write address, if the access request is valid.

The access request transmitted through the AXI bus is based on an AXI bus protocol, and an address signal carried in the access request is an access address based on the AXI bus protocol. According to the protocol conversion rule between the AXI bus and the CCI-P bus, the address signal based on the AXI bus protocol may be mapped, to obtain an access instruction that is based on the CCI-P bus protocol and contains the read/write address. For example, a read/write address signal 111111 based on the AXI bus protocol may be mapped to a read/write address 111000 based on a CCI-P bus protocol. Similarly, according to the protocol conversion rule between the AXI bus and the CCI-P bus, the address signal based on the CCI-P bus carried in the access request transmitted through the CCI-P bus may also be mapped, to obtain an access instruction that is based on the AXI bus and contains the read/write address.

Specifically, if the access request is determined to be valid, for the access request (including the read/write address) transmitted by the instance through the AXI bus, the fast link protocol converter of the FPGA chip may map, according to the protocol conversion rule between the AXI bus and the CCI-P bus, the read/write address transmitted according to the AXI bus protocol into the read/write address transmitted according to the CCI-P bus protocol, to obtain the access instruction containing the read/write address.

In an exemplary embodiment, the foregoing step 330 specifically includes:

writing continuously, according to the access object and an instruction type indicated by the access instruction, the access instruction into an instruction storage area corresponding to the access object and the instruction type, until the instruction storage area is full.

The access object includes the external device and the instance, and the instruction type includes a read instruction and a write instruction.

If the access instruction is a read instruction for accessing the external device, the read instruction is stored in a corresponding first read instruction asynchronous FIFO. According to a generating sequence of read instructions, the read instructions are buffered to the first read instruction asynchronous FIFO sequentially, if the first read instruction asynchronous FIFO is not full. If the flow control signal returned by the external device for the read instruction is not received, the read instructions may be continuously read from the first read instruction asynchronous FIFO and transmitted to the external device.

If the access instruction is a write instruction for accessing the external device, the write instruction is stored in a corresponding first write instruction asynchronous FIFO. According to a generating sequence of write instructions, the write instructions are buffered to the first write instruction asynchronous FIFO sequentially, if the first write instruction asynchronous FIFO is not full. Therefore, if the flow control signal returned by the external device for the write instruction is not received, the write instructions may be continuously read from the first write instruction asynchronous FIFO and transmitted to the external device.

If the access instruction is a read instruction for accessing the instance, the read instruction is stored in a corresponding second read instruction asynchronous FIFO. According to a generating sequence of read instructions, the read instructions are buffered to the second read instruction asynchronous FIFO sequentially, if the second read instruction asynchronous FIFO is not full. Therefore, if the flow control signal returned by the instance to the read instruction is not received, the read instructions may be continuously obtained from the second read instruction asynchronous FIFO and transmitted to the instance.

If the access instruction is a write instruction for accessing the instance, the write instruction is stored in a corresponding second write instruction asynchronous FIFO. According to a generating sequence of write instructions, the write instructions are buffered to the second write instruction asynchronous FIFO sequentially, if the second write instruction asynchronous FIFO is not full. Therefore, if the flow control signal returned by the instance for the write instruction is not received, the write instructions may be continuously obtained from the second write instruction asynchronous FIFO and transmitted to the instance.

Figure 7:
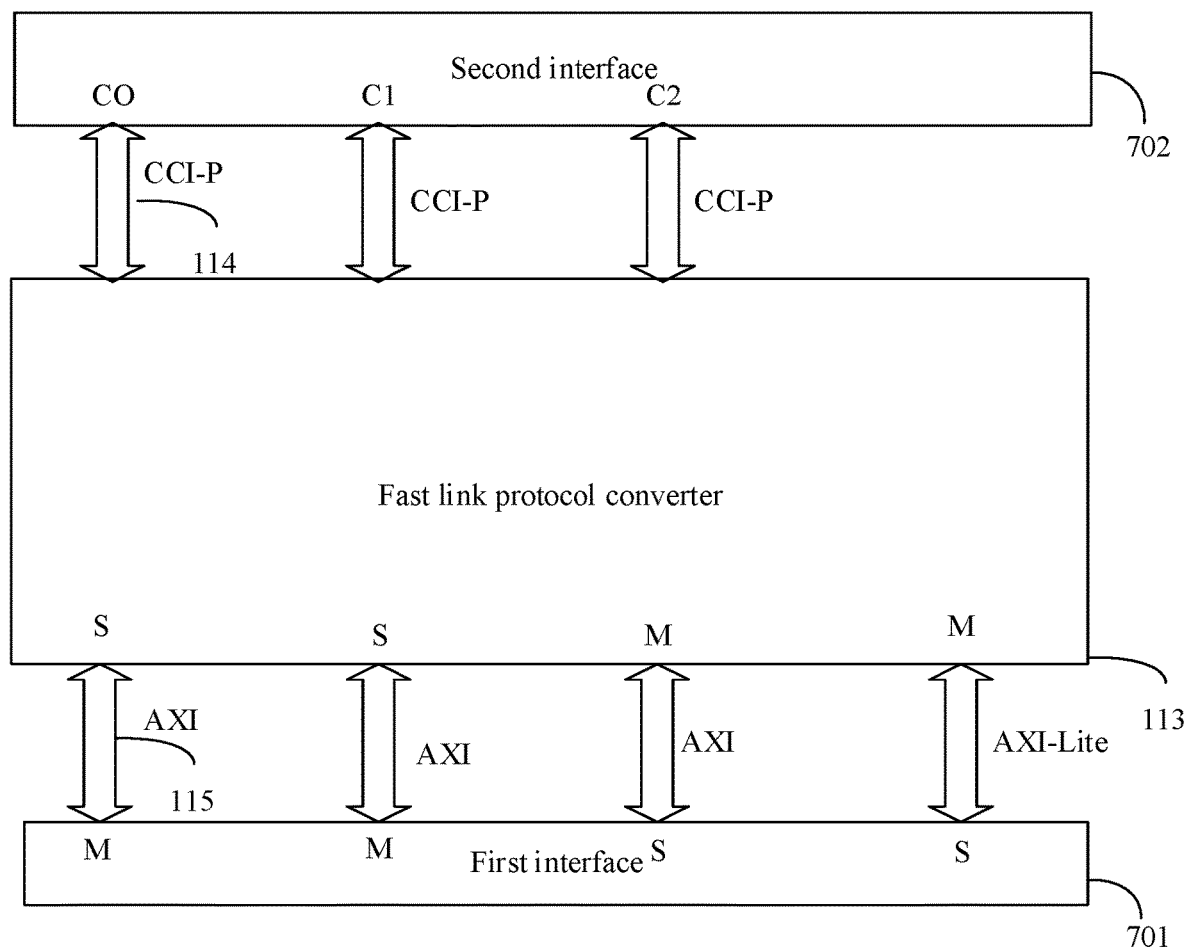
FIG. 7 is a system frame diagram of a bus conversion apparatus, deployed in an FPGA chip, for conversion between an AXI bus and a CCI-P bus.

FIG. 7 is a system frame diagram of a bus conversion apparatus for conversion between an AXI bus and a CCI-P bus deployed in an FPGA chip. As shown in FIG. 7, the bus conversion apparatus may include a fast link protocol converter 113, a first interface 701 of an AXI bus 115, and a second interface 702 of a CCI-P bus 114. The fast link protocol converter 113 connects the first interface 701 of the AXI bus 115 and the second interface 702 of the CCI-P bus 114, to implement asynchronous data transmission and stream mode data transmission between the AXI bus 115 and the CCI-P bus 114. Unless receiving a flow control signal, the fast link protocol converter 113 may continuously transmit data to the interfaces, to improve data transmission efficiency to a maximum extent, and avoid a waste of transmission bandwidths.

The AXI bus 115 includes four data transmission links, and the CCI-P bus 114 includes three data transmission links. The first interface 701 includes three independent AXI buses and one AXI-Lite bus, a port of two independent AXI buses thereof being a master (M: Master) and a port of one independent AXI bus being a slave (S: Slave). A port of the AXI-Lite bus is a slave (S: Slave). The second interface 702 is composed of three data transmission links, C0, C1 and C2.

Figure 8:
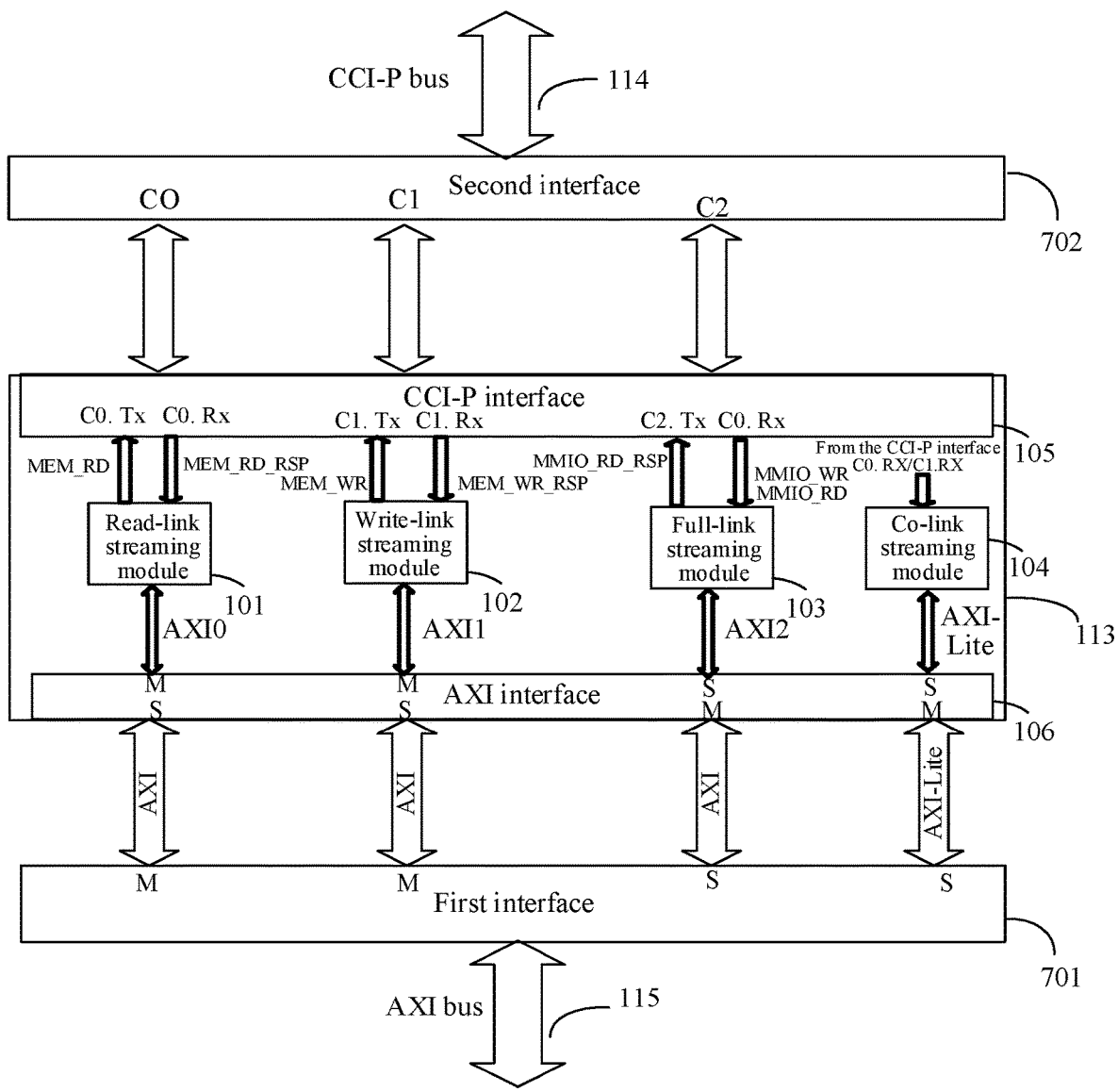
FIG. 8 is a detailed expanded diagram of the bus conversion apparatus shown in FIG. 7.

FIG. 8 is a detailed expanded diagram of the bus conversion apparatus shown in FIG. 7. The fast link protocol converter 113 includes an AXI interface 106, a CCI-P interface 105, a read-link streaming module 101, a write-link streaming module 102, a full-link streaming module 103 and a co-link streaming module 104. The CCI-P interface 105 includes three TX (transmitters) and two RX (receivers). Services may be classified into seven classes according to service types, and a correspondence is shown in Table 1 below.

TABLE 1

List of CCI-P interface service types

| CCI-P hardware interface | Service type |
|---|---|
| C0.TX | MEM_RD (Memory Read) |
| C0.RX | MEM_RD_RSP (Memory Read Response) |
| C1.TX | MEM_WR (Memory Write) |
| C1.RX | MEM_WR_RSP (Memory Write Response) |
| C2.TX | MMIO_RD_RSP (Memory Mapped IO Read Response) |
| C0.RX | MMIO_WR/MMIO_RD (Memory Mapped IO Write/Read) |

The AXI interface 106 includes three AXI buses (AXI0, AXI1, AXI2) and one AXI-Lite bus, the three AXI buses thereof transmit high-speed data and the AXI-Lite bus transmits low-speed configuration data such as additional header information. An interconnection relationship between the AXI interface 106 and the fast link protocol converter 113 is shown in Table 2 below.

TABLE 2

AXI bus interconnection relationship

| Bus number | Master | Slave |
|---|---|---|
| AXI0 | AXI interface | Read-link streaming module |
| AXI1 | AXI interface | Write-link streaming module |
| AXI2 | Full-link streaming module | AXI interface |
| AXI-Lite | Co-link streaming module | AXI interface |

Specifically, the read-link streaming module 101 is mainly configured to perform a read operation from the AXI bus 115 to the CCI-P bus 114, that is, receive a read request from the AXI bus 115, read data from the CCI-P bus 114 and return the data to the AXI bus 115 (namely, MEM_RD and MEM_RD_RSP services). The write-link streaming module 102 is mainly configured to perform a write operation from the AXI bus 115 to the CCI-P bus 114, that is, receive a write request from the AXI bus 115, write data into the CCI-P bus 114 and receive a returned write response (namely, MEM_WR and MEM_WR_RSP services). The full-link streaming module 103 is mainly configured to perform a read/write operation from the CCI-P bus 114 to the AXI bus 115, that is, write data into the AXI bus 115 or read data from the AXI bus 115 and return the data to the CCI-P bus 114 (namely, MMIO_WR, MMIO_RD, and MMIO_RD_RSP services). The co-link streaming module 104 mainly returns, to the AXI interface 106 through the AXI-Lite bus, additional header information contained in the memory write response and the memory read response transmitted by C0.RX and C1.RX ports. A description of services processed by the co-link streaming module 104 is shown in Table 3 below.

TABLE 3

Description of services processed by the co-processing module

| Service type | CCI-P hardware interface | Specific returned information |
|---|---|---|
| MEM_WR_RSP | C1.RX | Additional header information of the memory write response |
| MEM_RD_RSP | C0.RX | Additional header information of the memory read response |

Figure 9:
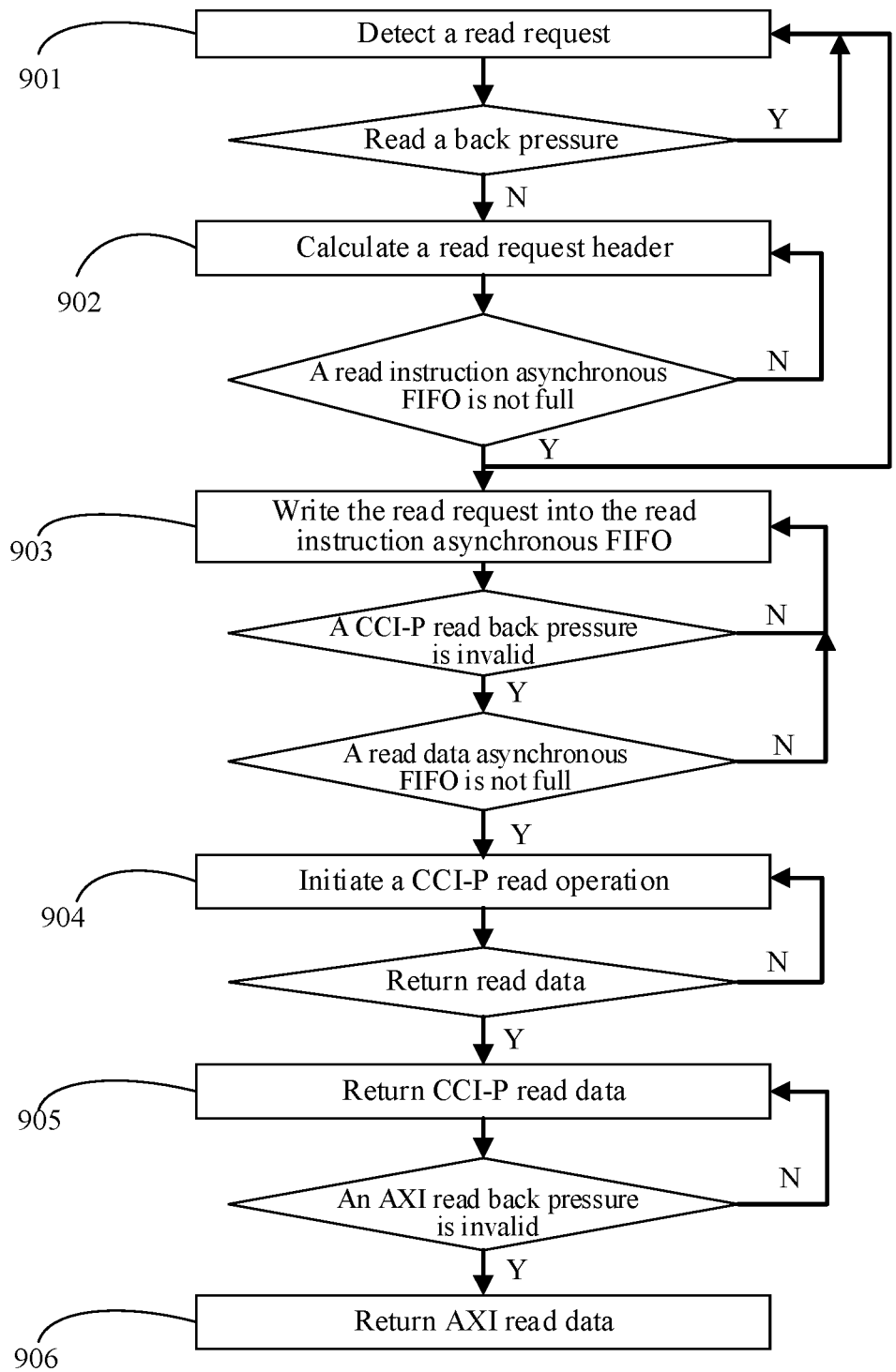
FIG. 9 is a schematic flowchart of processing a read request by a read-link streaming module in a fast link protocol converter according to an exemplary embodiment.

In an exemplary embodiment, if an access instruction is a read instruction for accessing an external device 120, and a bus corresponding to the external device 120 is a CCI-P bus 114 (with reference to the implementation environment shown in FIG. 1), a read-link streaming module 101 deployed in an FPGA chip 110 processes MEM_RD (Memory Read) and MEM_RD_RSP (Memory Read Response) services, to implement data transmission between different types of buses in the FPGA chip 110. The read-link streaming module 101 includes a read instruction asynchronous FIFO and a read data (i.e., data returned in response to the read instruction) asynchronous FIFO. As shown in FIG. 9, a specific workflow of the read-link streaming module 101 includes the following steps:

Step 901. Detect a read request. When the read-link streaming module is in an idle state, the read-link streaming module continuously monitors whether there is a read request and determines whether the read request is valid. If the current read request is valid, step 902 is performed.

Step 902. Calculate a read request header. A CCI-P bus read request header (that is, a read instruction containing a CCI-P bus read address) is calculated according to an AXI bus read address and other control information (such as a check code) carried in the read request.

Step 903. Write into a read instruction asynchronous FIFO. The read request header calculated through step 902 is written into the read instruction asynchronous FIFO if the read instruction asynchronous FIFO is not full.

Step 904. Initiate a CCI-P bus read operation (MEM_RD). If a read back pressure of a CCI-P interface is invalid (i.e., no back pressure) and the read data asynchronous FIFO is not full, the read operation is initiated at the C0.TX port of the CCI-P interface.

Step 905. Receive read data returned by the CCI-P bus. The read data returned from the C0.RX port of the CCI-P interface (MEM_RD_RSP) is written into the read data asynchronous FIFO.

Step 906. Return the corresponding read data to an AXI bus if a read back pressure of an AXI interface is invalid indicating there is no back pressure.

Figure 10:
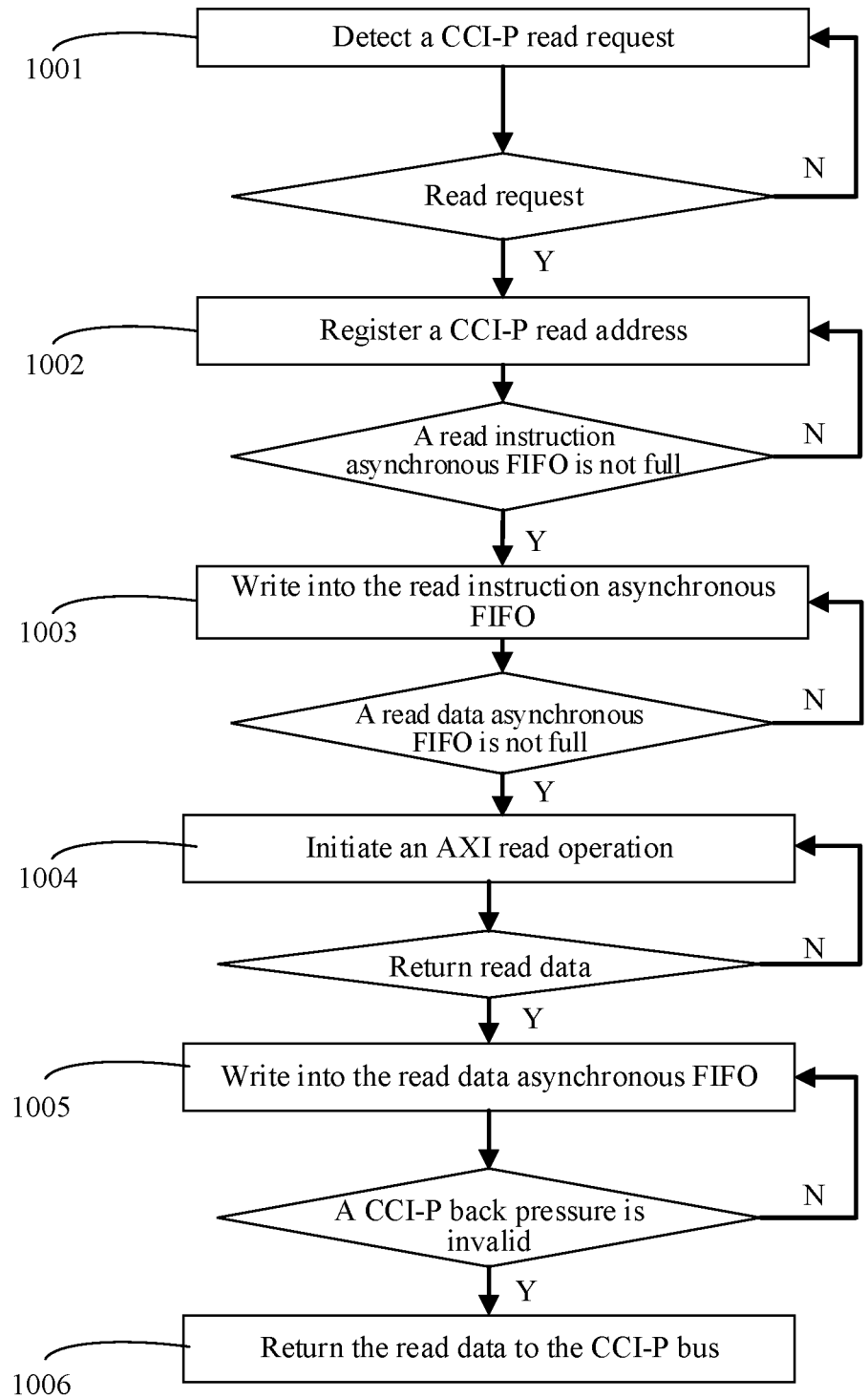
FIG. 10 is a schematic flowchart of processing a read request by a full-link streaming module in a fast link protocol converter according to an exemplary embodiment.

In another exemplary embodiment, if the access instruction is a read instruction for accessing an instance 111, and a bus corresponding to the instance 111 is an AXI bus 115 (with reference to the implementation environment shown in FIG. 1), a full-link streaming module 103 deployed in an FPGA chip 110 processes MMIO_RD_RSP (Memory Mapped I/O Read Response) and MMIO_RD (Memory Mapped I/O Read) services. The full-link streaming module 103 includes a read instruction asynchronous FIFO and a read data asynchronous FIFO. As shown in FIG. 10, a specific workflow of processing the MMIO_RD_RSP and MMIO_RD services and completing a read request by the full-link streaming module 103 includes the following steps:

Step 1001. Detect a read request received by a CCI-P C0.RX port. If a system is in an idle state, a link continuously monitors whether there is a read request at present. If the current read request is valid, step 1002 is performed.

Step 1002. Register a CCI-P bus read address, and calculate an AXI bus read address according to the CCI-P read address.

Step 1003. Write the AXI bus read address into the read instruction asynchronous FIFO if the read instruction asynchronous FIFO is not full.

Step 1004. Initiate a read operation to the AXI bus if the read data asynchronous FIFO is not full and a read back pressure of the AXI interface is invalid.

Step 1005. Write read data returned by the AXI interface into the read data asynchronous FIFO.

Step 1006. Return the corresponding read data to a CCI-P bus if a back pressure of the CCI-P C2.TX port is invalid.

During processing of a read task, because the read-link streaming module 101 and the full-link streaming module 103 of the FPGA chip 110 both include the read instruction asynchronous FIFO and the read data asynchronous FIFO, transmission of data and an instruction between asynchronous clock domains is supported between the AXI bus 115 and the CCI-P bus 114. The read-link streaming module 101 and the full-link streaming module 103 support stream mode data transmission. If the FIFO is not full, instructions or data is allowed to be continuously written in a streaming manner, and if there is no back pressure, instructions or data is outputted continuously, thereby improving data transmission efficiency to a maximum extent and improving a throughput.

Figure 11:
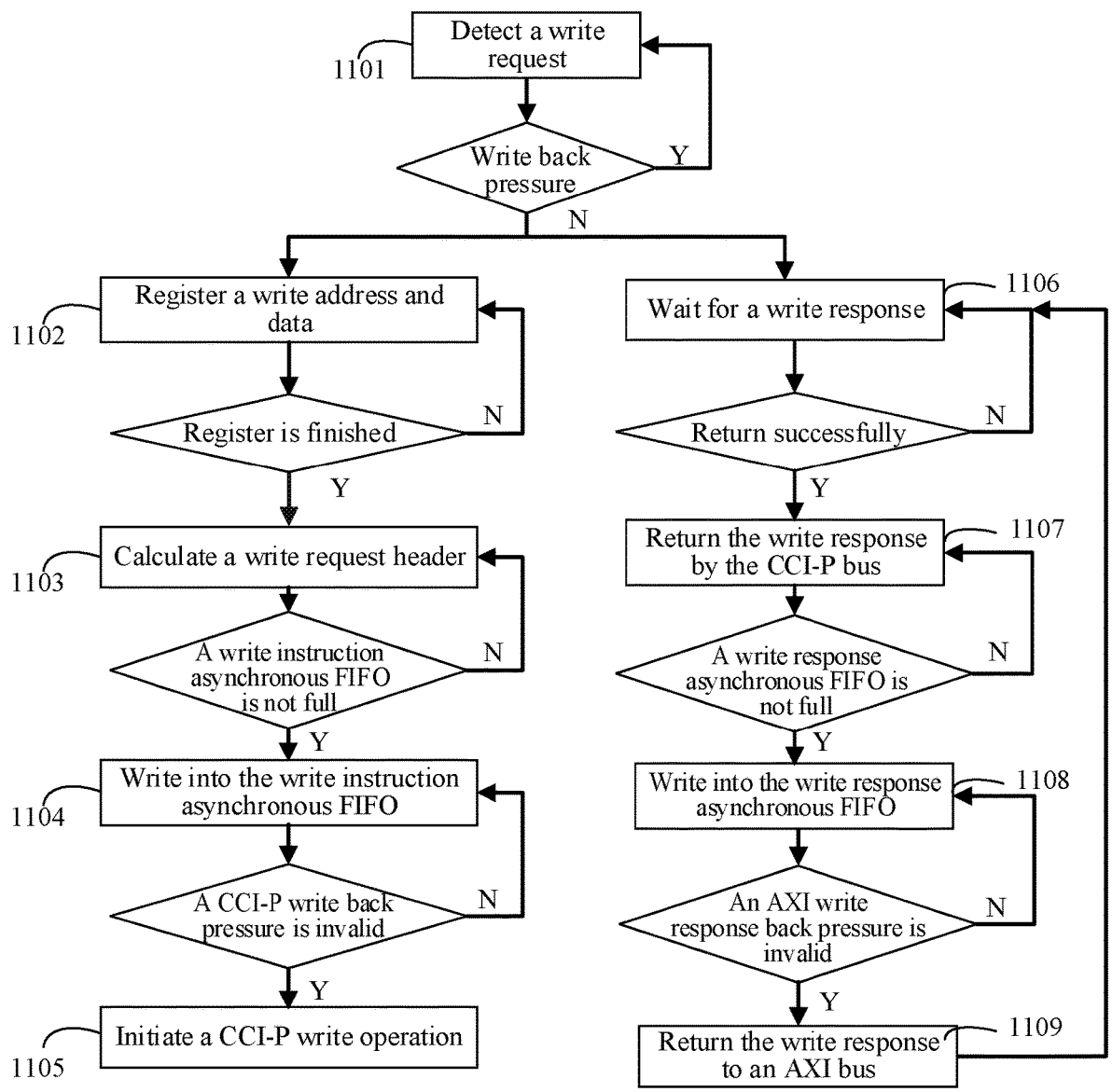
FIG. 11 is a schematic flowchart of processing a write request by a write-link streaming module in a fast link protocol converter according to an exemplary embodiment.

In an exemplary embodiment, if an access instruction is a write instruction for accessing an external device 120, and a bus corresponding to the external device 120 is a CCI-P bus 114 (with reference to the implementation environment shown in FIG. 1), a write-link streaming module 102 deployed in an FPGA chip 110 processes MEM_WR (Memory Write) and MEM_WR_RSP (Memory Write Response) services. The write-link streaming module 102 includes a write instruction asynchronous FIFO and a write response asynchronous FIFO. As shown in FIG. 11, a specific workflow of the write-link streaming module 102 includes the following steps:

Step 1101. Detect a write request. If a system is in an idle state, the write-link streaming module continuously detects whether there is a write request at present. If the current write request is valid, stages of MEM_WR and MEM_WR_RSP are entered at the same time.

For the MEM_WR stage, if the write request is valid, step 1102 is performed to register an AXI bus write address and data, then a write request header is calculated after the registration is finished.

Step 1103. Calculate the write request header, the CCI-P bus write request header (including a CCI-P bus write address) being calculated according to the current AXI bus write address and other control information.

Step 1104. Write the write address and write data (namely, the write instruction) into a write instruction asynchronous FIFO if the write instruction asynchronous FIFO is not full.

Step 1105. Initiate a CCI-P bus write operation. If a write back pressure of the CCI-P bus is invalid, a MEM_WR operation is initiated at a TX port of a CCI-P C1 bus.

For the MEM_WR_RSP stage, if the write request is valid, step 1106 is performed to enter a stage of waiting for a write response.

Step 1107. Receive a write response returned by the CCI-P bus.

Step 1108. Write the write response (MEM_WR_RSP) returned by CCI-P C1.RX into a write response asynchronous FIFO if the write response asynchronous FIFO is not full.

Step 1109. Return the corresponding write response to an AXI bus if a back pressure of a write response interface of the AXI bus is invalid.

Figure 12:
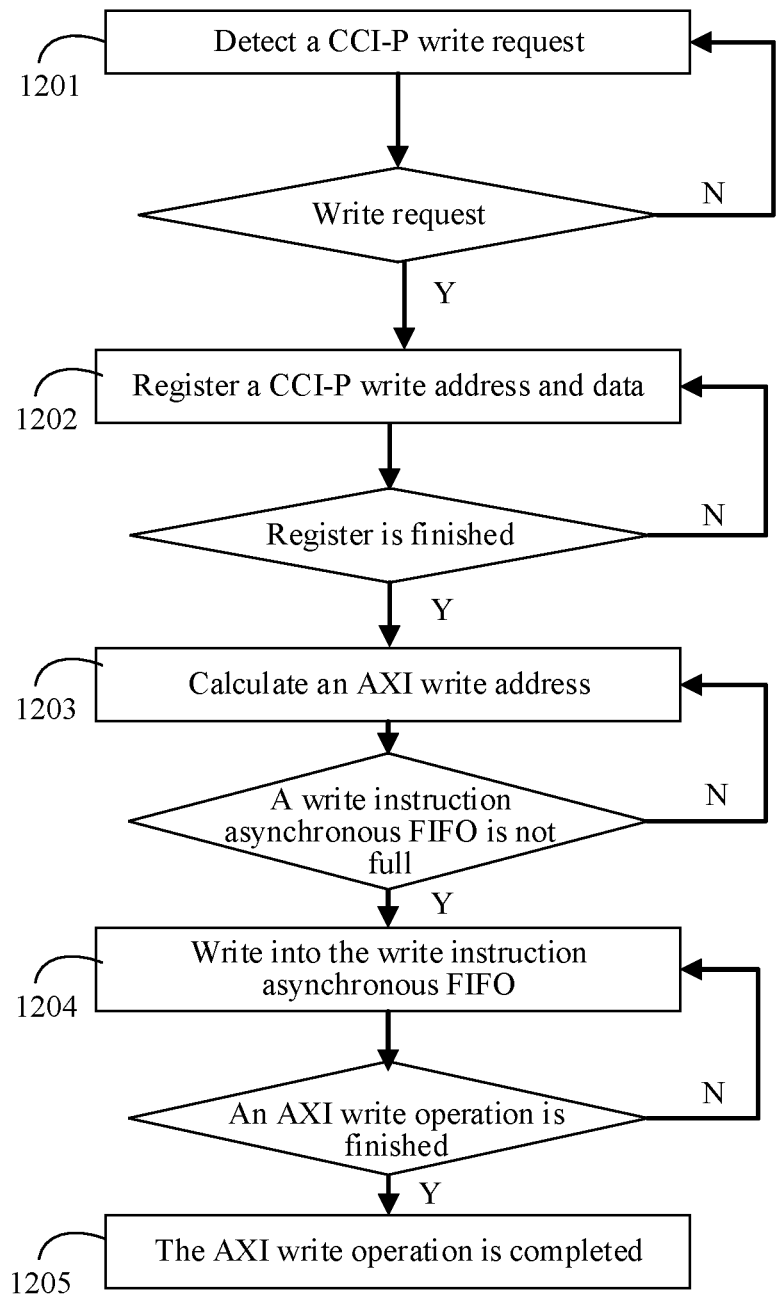
FIG. 12 is a schematic flowchart of processing a write request by a full-link streaming module in a fast link protocol converter according to an exemplary embodiment.

In an exemplary embodiment, if an access instruction is a write instruction for accessing an instance 111, and a bus corresponding to the instance 111 is an AXI bus 115 (with reference to the implementation environment shown in FIG. 1), a full-link streaming module 103 deployed in an FPGA chip 110 processes a MMIO_WR (Memory Mapped I/O Write) service. The full-link streaming module 103 supports parallel read and write operations. In addition to a read instruction asynchronous FIFO and a read data asynchronous FIFO, the full-link streaming module 103 further includes a write instruction asynchronous FIFO. As shown in FIG. 12, a specific workflow of processing the MMIO_WR service by the full-link streaming module 103 includes the following steps:

Step 1201. Detect a CCI-P C0.RX write request. If a system is in an idle state, it continuously monitors whether there is a write request at present. If a valid write request is detected, step 1202 is performed.

Step 1202. Register a CCI-P write address and data carried in the write request, and perform step 1203 after the register is finished.

Step 1203. Calculate an AXI write address according to the registered CCI-P bus write request header.

Step 1204. Write the write data and the AXI write address (namely, a write instruction) into a write instruction asynchronous FIFO if the write instruction asynchronous FIFO is not full.

Step 1205. Perform a write operation on an AXI bus until the operation is finished, if a back pressure of an AXI bus write port is invalid.

During processing of a write task, because the write-link streaming module 102 of the FPGA chip 110 includes the write instruction asynchronous FIFO and the write response asynchronous FIFO, and the full-link streaming module 103 includes the write instruction asynchronous FIFO for buffering the write data and the write address, transmission of data and an instruction between asynchronous clock domains is supported between the AXI interface 106 of the FPGA chip 110 and the CCI-P interface 105. The write-link streaming module 102 and the full-link streaming module 103 support stream mode data transmission. If the FIFO is not full, instructions or data is allowed to be continuously written in a streaming manner, and if there is no back pressure, instructions or data is outputted continuously, thereby improving data transmission efficiency to a maximum extent, improving a throughput, and overcoming the problem of a waste of bandwidths caused by bandwidth mismatch.

Figure 13:
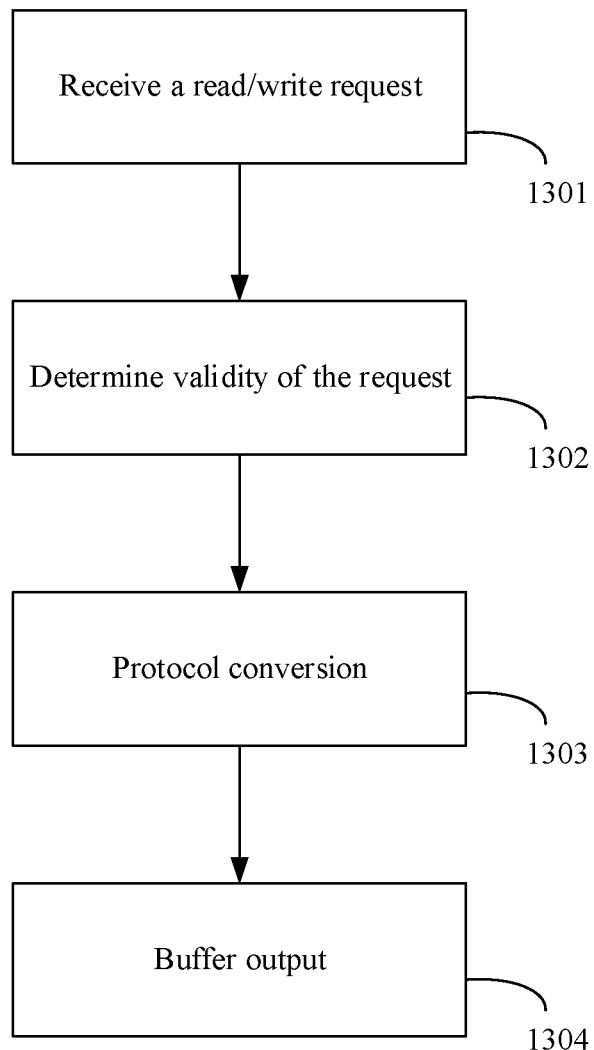
FIG. 13 is a complete schematic flowchart of a method for implementing data transmission according to an exemplary embodiment of this application.

FIG. 13 is a complete schematic flowchart of a method for implementing data transmission according to an exemplary embodiment of this application. Assuming that a bus used by an FPGA chip is a CCI-P bus, and a bus used by an instance migrated from another chip is an AXI bus, as shown in FIG. 13, the method for implementing data transmission may include the following steps: For a circumstance that the FPGA chip uses an AXI bus and the instance uses a CCI-P bus, or any different kinds of buses, reference may be made to this embodiment for implementation.

Step 1301. A fast link protocol converter of the FPGA receives a read/write request transmitted by the instance through the AXI bus (or by an external device through the CCI-P bus).

Step 1302. Determine whether the read/write request is valid according to identification information carried in an access request.

Step 1303. Map, according to a protocol conversion rule between the AXI bus and the CCI-P bus, the access request, to obtain a read/write instruction containing a read/write address, if the access request is valid.

Step 1304. Continuously buffer a read instruction if a read instruction asynchronous FIFO is not full, and continuously transmit, according to a first in first out principle, the buffered read instruction to the external device through the CCI-P bus (or to the instance through the AXI bus), if a flow control signal returned by the external device through the CCI-P bus (or by the instance through the AXI bus) for the read instruction is not received.

A write instruction is continuously buffered if a write instruction asynchronous FIFO is not full, and according to the first in first out principle, the buffered write instruction is continuously transmitted to the external device through the CCI-P bus (or to the instance through the AXI bus), if a flow control signal returned by the external device through the CCI-P bus (or by the instance through the AXI bus) for the write instruction is not received.

The following is an apparatus embodiment of this application that may be configured to execute the embodiments of the method for implementing data transmission in this application which is executed by the fast link protocol converter in the FPGA chip. For details not disclosed in the apparatus embodiment of this application, reference may be made to the embodiments of the method for implementing data transmission in this application.

Figure 14:
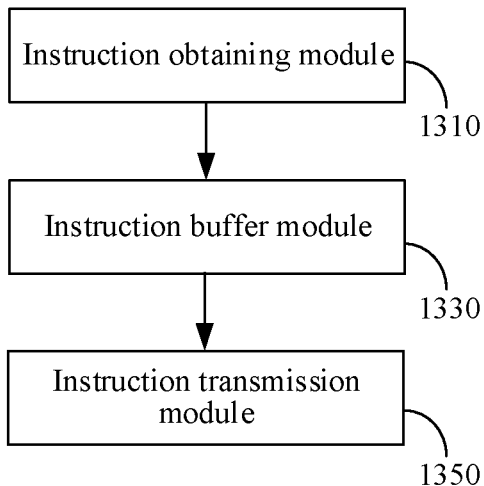
FIG. 14 is a block diagram of an apparatus for implementing data transmission according to an exemplary embodiment.

FIG. 14 is a block diagram of an apparatus for implementing data transmission according to an exemplary embodiment. The apparatus for implementing data transmission may be used in an FPGA chip 110 in an implementation environment shown in FIG. 1, to perform all or some of steps of the method for implementing data transmission shown in any one of FIG. 3 to FIG. 6, and FIG. 9 to FIG. 13. As shown in FIG. 14, the apparatus includes, but is not limited to an instruction obtaining module 1310, an instruction buffer module 1330, and an instruction transmission module 1350.

The instruction obtaining module 1310 is configured to obtain an access instruction for data read/write, the access instruction being initiated by either an instance or an external device through a bus.

The instruction buffer module 1330 is configured to buffer the access instruction into an instruction storage area corresponding to the access instruction.

The instruction transmission module 1350 is configured to transmit continuously, according to an access object indicated by the access instruction, the access instruction buffered in the instruction storage area to the access object, and stop transmission of the access instruction until flow control is imposed.

For details about the implementation processes of the functions and effects of the modules in the foregoing apparatus, refer to the implementation processes of the corresponding steps in the foregoing method for implementing data transmission. Details are not described herein again.

The instruction obtaining module 1310, the instruction buffer module 1330, and the instruction transmission module 1350 may be functional modules configured to perform the corresponding steps of the foregoing method for implementing data transmission. It is to be understood that, the modules may be implemented by hardware, software, or a combination of the two. When implemented by hardware, the modules may be implemented as one or more hardware modules, such as one or more application specific integrated circuits. When implemented by software, the modules may be implemented as one or more computer programs executed on one or more processors.

In an exemplary embodiment, the instruction transmission module 1350 includes, but is not limited to:

an asynchronous transmission unit, configured to transmit continuously, according to a clock cycle of transmitting the access instruction to the access object, the access instruction buffered in the instruction storage area to the access object, until receiving a flow control signal returned by the access object for the access instruction.

Figure 15:
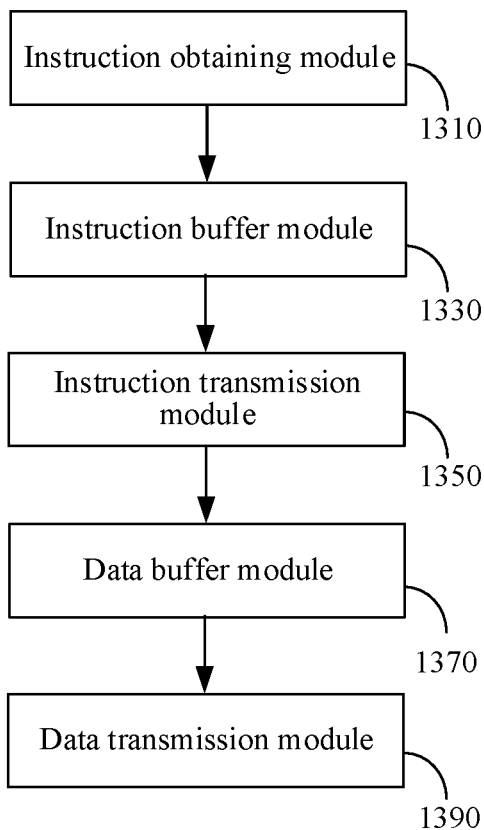
FIG. 15 is a block diagram of an apparatus for implementing data transmission according to another exemplary embodiment based on the embodiment corresponding to FIG. 14.

In an exemplary embodiment, as shown in FIG. 15, the method for implementing data transmission provided according to this application further includes, but is not limited to:

a data buffer module 1370, configured to buffer read/write feedback data returned by the access object according to the access instruction in the data storage area corresponding to the access instruction; and a data transmission module 1390, configured to transmit continuously, according to an initiator of the access instruction, the read/write feedback data buffered in the data storage area to the initiator, until receiving a flow control signal returned by the initiator for the read/write feedback data.

In an exemplary embodiment, the instruction transmission module 1350 includes, but is not limited to:

a continuous transmission unit, configured to continuously transmit the access instruction to the access object until receiving a flow control signal returned by the access object for the access instruction, if the data storage area is not full.

Figure 16:
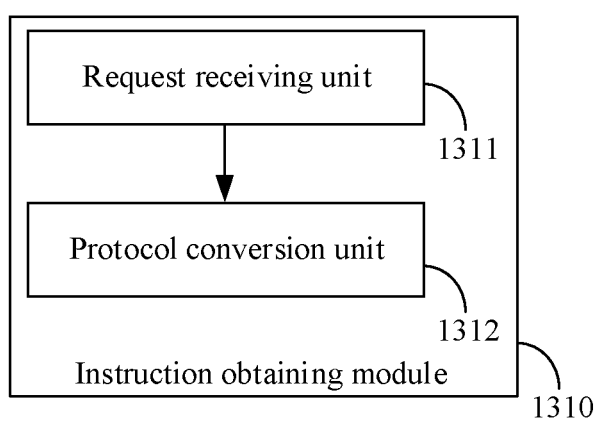
FIG. 16 is a block diagram of details of an instruction obtaining module in the embodiment corresponding to FIG. 14.

In an exemplary embodiment, as shown in FIG. 16, the instruction obtaining module 1310 includes, but is not limited to:

a request receiving unit 1311, configured to receive an access request for data read/write, the access request being initiated by either the instance or the external device through the bus; and a protocol conversion unit 1312, configured to process the access request to obtain the corresponding access instruction according to a protocol conversion rule between different types of buses.

The foregoing request receiving unit 1311 includes, but is not limited to:

a first subunit, configured to obtain, through an AXI bus or a CCI-P bus corresponding to the instance run by a computing service, an access request initiated by the instance and used for performing data read/write on the external device;

or, a second subunit, configured to receive, through an AXI bus or a CCI-P bus corresponding to the external device, an access request initiated by the external device and used for performing the data read/write on the instance run by the computing service.

The foregoing protocol conversion unit 1312 includes, but is not limited to:

a determining subunit, configured to determine validity of the access request according to identification information carried in the access request; and a conversion subunit, configured to map, according to the protocol conversion rule between the different types of buses, an access request containing an address signal, to obtain an access instruction containing a read/write address, if the access request is valid.

In an exemplary embodiment, the foregoing instruction buffer module 1330 includes, but is not limited to:

a continuous buffer unit, configured to write continuously, according to the access object and an instruction type indicated by the access instruction, the access instruction into an instruction storage area corresponding to the access object and the instruction type, until the instruction storage area is full.

This application further provides an electronic device. The electronic device may be applied to an FPGA chip 110 in the foregoing implementation environment shown in FIG. 1, and perform all or some of the steps of the method for implementing data transmission shown in any one of FIG. 3 to FIG. 6, and FIG. 9 to FIG. 13. Specifically, the electronic device may include:

a processor; a memory that is configured to store a processor-executable instruction, the processor being configured to perform the method for implementing data transmission in the foregoing embodiments.

A specific implementation of operations performed by the processor of the electronic device in this embodiment has been described in detail in the embodiments concerning the method for implementing data transmission, and details are not described herein.

In an exemplary embodiment, a storage medium is further provided. The storage medium is a computer-readable storage medium. For example, the storage medium may be a transitory or non-transitory computer-readable storage medium including instructions. The storage medium stores a computer program, and the computer program may be executed by the FPGA chip 110 in the foregoing implementation environment shown in FIG. 1, to complete the foregoing method for implementing data transmission.

It is to be understood that this application is not limited to the precise structures described above and shown in the accompanying drawings, and various modifications and changes may be made without departing from the scope of this application. The scope of this application is subject to the appended claims.

What is claimed is:

1. A method for implementing data transmission, executed by an electronic device providing a computing service, the method being applied to execution of data transmission between two buses of different types, wherein one of the two buses is associated with an FPGA instance among multiple FPGA instances run by the computing service and the other of the two buses corresponds to an external device to the electronic device, the method comprising:

obtaining an access instruction from an initiator through a first bus of the two buses for data read/write in a target, wherein the initiator and the target are associated with the first bus and a second bus of the two buses, and comprise one and the other of the FPGA instance and the external device, respectively;

buffering the access instruction into an instruction storage area corresponding to the access instruction;

transmitting the access instruction buffered in the instruction storage area to the target continuously, and suspending transmission of the access instruction to the target once a flow control is imposed, wherein the flow control indicates that the target has no extra processing capability to process the access instruction;

receiving a response to the access instruction from the target and storing the response in a response storage area;

receiving a low speed configuration information associated with the response and storing the low speed configuration information in a configuration storage area which is separate from the response storage area, wherein the low speed configuration information comprises a header information and an error check code; and transmitting the response and the low speed configuration information to the initiator through the first bus.

2. The method according to claim 1, wherein transmitting the access instruction buffered in the instruction storage area continuously to the target comprises:

transmitting continuously, according to a clock cycle of transmitting the access instruction to the target, the access instruction buffered in the instruction storage area to the target, until receiving a flow control signal returned by the target.

3. The method according to claim 1, further comprising:

buffering read/write feedback data returned by the target into a data storage area corresponding to the access instruction; and transmitting the read/write feedback data buffered in the data storage area continuously to the initiator, until receiving a flow control signal returned by the initiator for the read/write feedback data.

4. The method according to claim 3, wherein transmitting the access instruction buffered in the instruction storage area to the target continuously, and suspending transmission of the access instruction to the target the once flow control is imposed comprises:

transmitting the access instruction buffered in the instruction storage area to the target continuously until receiving the flow control signal returned by the target, when the data storage area is not full.

5. The method according to claim 1, wherein obtaining the access instruction from the initiator through the first bus of the two buses for data read/write in the target comprises:

receiving an access request for data read/write from the initiator; and obtaining the access instruction corresponding to the access request according to a protocol conversion rule between the two buses.

6. The method according to claim 5, wherein receiving the access request for data read/write comprises:

receiving, through an AXI bus or a CCI-P bus corresponding to the FPGA instance, an access request initiated by the FPGA instance and used for performing data read/write in the external device.

7. The method according to claim 5, wherein receiving the access request for data read/write comprises:
receiving, through a CCI-P bus or an AXI bus corresponding to the external device, an access request initiated by the external device and used for performing data read/write in the FPGA instance.

8. The method according to claim 5, wherein obtaining the access instruction corresponding to the access request according to the protocol conversion rule between the two buses comprises:
determining validity of the access request according to identification information carried in the access request; and
mapping, according to the protocol conversion rule between the two buses, the access request containing an address signal, to an access instruction containing a read/write address, when the access request is valid.

9. The method according to claim 1, wherein buffering the access instruction into the instruction storage area corresponding to the access instruction comprises:
writing continuously, according to the target and an instruction type indicated by the access instruction, the access instruction into an instruction storage area corresponding to the target and the instruction type, until the instruction storage area is full.

10. An apparatus for implementing data transmission between two buses of different types, wherein one of the two buses is associated with an FPGA instance among multiple FPGA instances run by a computing service provided by the apparatus and the other of the two buses corresponds to an external device to the apparatus, the apparatus comprising a memory for storing computer readable instructions and a processor in communication with the memory, wherein the processor is configured to execute the computer readable instructions to cause the apparatus to:
obtain an access instruction from an initiator through a first bus of the two buses for data read/write in a target, wherein the initiator and the target are associated with the first bus and a second bus of the two buses, and comprise one and the other of the FPGA instance and the external device, respectively;
buffer the access instruction into an instruction storage area corresponding to the access instruction;
transmit the access instruction buffered in the instruction storage area to the target continuously, and suspend transmission of the access instruction to the target once a flow control is imposed, wherein the flow control indicates that the target has no extra processing capability to process the access instruction;
receive a response to the access instruction from the target and storing the response in a response storage area;
receive a low speed configuration information associated with the response and store the low speed configuration information in a configuration storage area which is separate from the response storage area, wherein the low speed configuration information comprises a header information and an error check code; and
transmit the response and the low speed configuration information to the initiator through the first bus.

11. The apparatus according to claim 10, wherein, when the processor is configured to cause the apparatus to transmit the access instruction buffered in the instruction storage area continuously to the target, the processor is configured to cause the apparatus to:
transmit continuously, according to a clock cycle of transmitting the access instruction to the target, the access instruction buffered in the instruction storage area to the target, until receiving a flow control signal returned by the target.

12. The apparatus according to claim 10, wherein, when the processor executes the instructions, the processor is configured to further cause the apparatus to:
buffer read/write feedback data returned by the target into a data storage area corresponding to the access instruction; and
transmit the read/write feedback data buffered in the data storage area continuously to the initiator, until receiving a flow control signal returned by the initiator for the read/write feedback data.

13. The apparatus according to claim 12, wherein, when the processor is configured to cause the apparatus to transmit the access instruction buffered in the instruction storage area to the target continuously, and suspend transmission of the access instruction to the target once the flow control is imposed, the processor is configured to cause the apparatus to:
transmit the access instruction buffered in the instruction storage area to the target continuously until receiving the flow control signal returned by the target, when the data storage area is not full.

14. The apparatus according to claim 10, wherein, when the processor is configured to cause the apparatus to obtain the access instruction from the initiator through the first bus of the two buses for data read/write in the target, the processor is configured to cause the apparatus to:
receive an access request for data read/write from the initiator; and
obtain the access instruction corresponding to the access request according to a protocol conversion rule between the two buses.

15. The apparatus according to claim 14, wherein, when the processor is configured to cause the apparatus to receive the access request for data read/write, the processor is configured to cause the apparatus to:
receive, through an AXI bus or a CCI-P bus corresponding to the FPGA instance, an access request initiated by the FPGA instance and used for performing data read/write in the external device.

16. The apparatus according to claim 14, wherein, when the processor is configured to cause the apparatus to receive the access request for data read/write, the processor is configured to cause the apparatus to:
receive, through a CCI-P bus or an AXI bus corresponding to the external device, an access request initiated by the external device and used for performing data read/write in the FPGA instance.

17. The apparatus according to claim 14, wherein, when the processor is configured to cause the apparatus to obtain the access instruction corresponding to the access request according to the protocol conversion rule between the two buses, the processor is configured to cause the apparatus to:
determine validity of the access request according to identification information carried in the access request; and
map, according to the protocol conversion rule between the two buses, the access request containing an address signal, to an access instruction containing a read/write address, when the access request is valid.

18. The apparatus according to claim 10, wherein, when the processor is configured to cause the apparatus to buffer the access instruction into the instruction storage area corresponding to the access instruction, the processor is configured to cause the apparatus to:

write continuously, according to the target and an instruction type indicated by the access instruction, the access instruction into an instruction storage area corresponding to the target and the instruction type, until the instruction storage area is full.

19. A non-transitory storage medium storing computer readable instructions, wherein the instructions, when executed by a processor for implementing data transmission between two buses of different types with one of the two buses being associated with an FPGA instance among multiple FPGA instances run by a computing service provided by the processor and the other of the two buses corresponding to an external device to the processor, cause the processor to:

obtain an access instruction from an initiator through a first bus of the two buses for data read/write in a target, wherein the initiator and the target are associated with the first bus and a second bus of the two buses, and comprise one and the other of the FPGA instance and the external device, respectively;

buffer the access instruction into an instruction storage area corresponding to the access instruction;

transmit the access instruction buffered in the instruction storage area to the target continuously, and suspend transmission of the access instruction to the target once a flow control is imposed, wherein the flow control indicates that the target has no extra processing capability to process the access instruction;

receive a response to the access instruction from the target and storing the response in a response storage area;

receive a low speed configuration information associated with the response and store the low speed configuration information in a configuration storage area which is separate from the response storage area, wherein the low speed configuration information comprises a header information and an error check code; and transmit the response and the low speed configuration information to the initiator through the first bus.

20. The non-transitory storage medium according to claim 19, wherein, when the instructions cause the processor to transmit the access instruction buffered in the instruction storage area continuously to the target, the instructions cause the processor to:

transmit continuously, according to a clock cycle of transmitting the access instruction to the target, the access instruction buffered in the instruction storage area to the target, until receiving a flow control signal returned by the target.

* * * * *